(12) United States Patent
Kalle

(10) Patent No.: US 11,853,376 B1
(45) Date of Patent: Dec. 26, 2023

(54) MIRRORING A DIGITAL TWIN UNIVERSE THROUGH THE DATA FUSION OF STATIC AND DYNAMIC LOCATION, TIME AND EVENT DATA

(71) Applicant: ARCANOR BILGI TEKNOLOJILERI VE HIZMETLERI A.S., Sisli / Istanbul (TR)

(72) Inventor: Kaan Kalle, Istanbul (TR)

(73) Assignee: ARCANOR BILGI TEKNOLOJILERI VE HIZMETLERI A.S., Istanbul (TR)

(*) Notice: Subject to any disclaimer, the term of this patent is extended or adjusted under 35 U.S.C. 154(b) by 0 days.

(21) Appl. No.: 17/969,639

(22) Filed: Oct. 19, 2022

(51) Int. Cl.
G06F 16/9537 (2019.01)
G06F 16/9535 (2019.01)

(52) U.S. Cl.
CPC ...... *G06F 16/9537* (2019.01); *G06F 16/9535* (2019.01)

(58) Field of Classification Search
CPC .......................... G06F 16/9537; G06F 16/9535
See application file for complete search history.

(56) References Cited

U.S. PATENT DOCUMENTS

| | | | |
|---|---|---|---|
| 10,979,484 B2 | 4/2021 | Palappetty et al. | |
| 2018/0322197 A1* | 11/2018 | Hesterman | G06F 16/75 |
| 2021/0144510 A1 | 5/2021 | Yang et al. | |
| 2023/0041975 A1* | 2/2023 | Caldwell | G05B 13/0265 |
| 2023/0237349 A1* | 7/2023 | Donoho | G06Q 50/26 |
| | | | 706/46 |

* cited by examiner

*Primary Examiner* — Grace Park
(74) *Attorney, Agent, or Firm* — IP AUTHORITY, LLC; Ramraj Soundararajan

(57) ABSTRACT

A system and method for creating mobile device or vehicle profiles (mobile object) using location, time, event, and unrelated data. The method includes generating profiles through the collection and aggregation of raw mobile object data, its enrichment through data fusion via FPGA, GPU, TPU, and similar chips, matching them with unique geometric shapes, groups of unique and similar geometric shapes, with unrelated layers of time and location-based data sources, scanning the enriched data through cloud clustered parallel processing workflows, generating profile and group based statistics, behavior and metadata, deploying spatial algorithms, storing the enriched data in a datastore accessible through internal and external platforms, running deep learning, evolutionary algorithms and artificial life models to create look-alikes and patterns, sharing them across external platforms for historical analysis, real time analysis or predictive forecasts, building, mirroring and regenerating a digital twin universe of the physical dimension, simulating and iterating parallel digital universes.

8 Claims, 26 Drawing Sheets

FIG. 6B

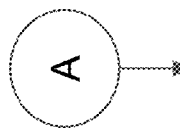

Generating profile lifecycles through the aggregation of profiles by parent, child and grandchild locations varied through time ranges and intervals
2008

Generating location lifecycles through the aggregation of locations by parent, child and grandchild locations varied through time ranges and intervals
2009

Generating event lifecycles through the aggregation of events by parent, child and grandchild locations varied through time ranges and intervals
2010

Combining profile, location and event lifecycles through hierarchies or across hierarchies of profiles as segments, locations and time
2011

Inferring profile lifecycles reaction across locations, locations lifecycle across events and event lifecycles across profiles
2012

Generating profiles across unique identifiers, groups of identifiers or segments associating mutual locations, relationships, mutual events or locations
2013

Raw data received from MAIDs (Googles GAID or iOS IDFA and IDFV)

| maid | latitude | longitude | timestamp |
|---|---|---|---|

*example*

| maid | latitude | longitude | timestamp |
|---|---|---|---|
| 0ac0ad6d-9209-4cf1-9e2b-b996f3b3c6... | 37.90991 | 40.14774 | 1620410115 |

What we create

Generating Parents (hierarchy) from the raw data

| maid | latitude | longitude | timestamp | city |
|---|---|---|---|---|

*example*

| maid | latitude | longitude | timestamp | city |
|---|---|---|---|---|
| 0ac0ad6d-9209-4cf1-9e2b-b996f3b3c6... | 37.90991 | 40.14774 | 1620470115 | Diyarbakir |

FIG. 7A

Generating Children (districts are a sub-branch of cities) from Parents from the raw data

| maid | latitude | longitude | timestamp | city | district |
|------|----------|-----------|-----------|------|----------|

*example*

| maid | latitude | longitude | timestamp | city | district |
|------|----------|-----------|-----------|------|----------|
| 0ac0ad6d-9209-4cf1-9e2b-b996f3b3c6... | 37.90991 | 40.14774 | 1620410115 | Diyarbakir | Baglar |

FIG. 7B

Generating Grandchildren (neighborhoods are a sub-branch of districts) from Parents from the raw data

| maid | latitude | longitude | timestamp | city | district | neighborhood |
|------|----------|-----------|-----------|------|----------|--------------|

*example*

| maid | latitude | longitude | timestamp | city | district | neighborhood |
|------|----------|-----------|-----------|------|----------|--------------|
| 0ac0ad6d-9209-4cf1-9e2b-b996f3b3c6 | 37.90991 | 40.14774 | 16204101115 | Diyarbakir | Baglar | Bagcilar Mahallesi |

FIG. 7C

Generating further attributes with regards to the location (building type: residential)

| maid | latitude | longitude | timestamp | city | district | neighborhood | poi_fclass |
|---|---|---|---|---|---|---|---|
| 0ac0ad6d-9209-4cf1-9e2b-b996f3b3c6.... | 37.90991 | 40.14774 | 1620410115 | Diyarbakir | Baglar | Bagcilar Mahallesi | residential |

FIG. 7D

Generating further attributes with regards to the location (transportation type: service road)

| maid | latitude | longitude | timestamp | city | district | neighborhood | lin_fclass |
|---|---|---|---|---|---|---|---|
| 0ac0ad6d-9209-4cf1-9e2b-b996f3b3c6.... | 37.90991 | 40.14774 | 1620410115 | Diyarbakir | Baglar | Bagcilar Mahallesi | service |

FIG. 7E

Generating further attributes with regards to the location (transportation/Street name: Yeni Hal Caddesi(*street*))

| maid | latitude | longitude | timestamp | city | district | neighborhood | lin_fclass | lin_name |
|---|---|---|---|---|---|---|---|---|
| 0f059f53-07d9-4236-98c8-1bc09952c6... | 37.9252 | 40.181156 | 1620351307 | Diyarbakir | Baglar | Baglar Mahallesi | tertiary | Yeni Hal Caddesi |

FIG. 7F

Generating further attributes from the previously created data

| observation-tower | optician | orchard | outdoor-shop | park | parking | parking_bicycle | parking_multistorey | parking_underground | peak |
|---|---|---|---|---|---|---|---|---|---|
| 0 | 0 | 0 | 0 | 4 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 7G

Generating homezones and workzones of MAIDs (aggregating them as well) across filtered cities, districts, polygons and showing their movements across cities, districts, polygons.

Homezone Neighborhood x Workzone City-District-Neighborhood

| metric | COUNT(*) | | | | | | | | | | | | | | | | |
|---|---|---|---|---|---|---|---|---|---|---|---|---|---|---|---|---|---|
| wz_city | istanbul | istanbul | | Kocaeli | istanbul | Kocaeli | istanbul | | | | | | | Kocaeli | istanbul | | Kocae |
| wz_district | Tuzla | Pendik | Kartal | Gebze | Sultanbeyli | Cayirova | Umaraniye | Sancaktepe | Maltepe | Uskudar | Kadikoy | Atasehir | Cekmekoy | Darica | Beykoz | Fatih |
| hz_neighborhood | | | | | | | | | | | | | | | | | |
| Aydinli mahallesi | 9.47k | 6.03k | 616 | 160 | 110 | 118 | 103 | 126 | 96 | 87 | 79 | 74 | 48 | 12 | 44 | 38 | 28 | 25 |
| sifa Mahallesi | 4.17k | 3.08k | 211 | 61 | 151 | 60 | 205 | 48 | 47 | 40 | 52 | 28 | 20 | 5 | 29 | 21 | 16 | 7 |
| Yayla Mahallesi | 3.12k | 2.64k | 162 | 61 | 23 | 37 | 18 | 49 | 46 | 29 | 34 | 34 | 42 | 11 | 26 | 9 | 19 | 11 |
| Aydintepe mahallesi | 3.01k | 2.39k | 188 | 51 | 36 | 34 | 12 | 44 | 28 | 16 | 35 | 31 | 28 | 72 | 22 | 9 | 17 | 12 |
| Evliya celebi Mahallesi | 3.06k | 2.26k | 232 | 51 | 47 | 52 | 19 | 53 | 31 | 23 | 17 | 15 | 22 | 90 | 14 | 11 | 12 | 8 |
| Mimar sinan Mahallesi | 2.38k | 1.99k | 150 | 42 | 27 | 43 | 78 | 25 | 35 | 30 | 21 | 16 | 25 | 3 | 24 | 12 | 8 | 9 |
| istasyon Mahallesi | 2.43k | 1.4k | 109 | 31 | 36 | 29 | 18 | 24 | 23 | 28 | 22 | 22 | 24 | 5 | 17 | 13 | 3 | 10 |
| Postane Mahallesi | 2.06k | 1.45k | 134 | 36 | 32 | 30 | 14 | 18 | 26 | 26 | 18 | 24 | 17 | 18 | 16 | 8 | 7 | 10 |
| Orhanli Mahallesi | 1.83k | 926 | 94 | 23 | 21 | 38 | 24 | 19 | 24 | 8 | 14 | 8 | 15 | | 12 | 6 | 3 | 2 |
| Icmeler Mahallesi | 1.36k | 1.21k | 69 | 34 | 13 | 21 | 5 | 13 | 21 | 14 | 19 | 22 | 7 | 33 | 5 | 6 | 3 | 7 |

FIG. 7K

MIRRORING A DIGITAL TWIN UNIVERSE THROUGH THE DATA FUSION OF STATIC AND DYNAMIC LOCATION, TIME AND EVENT DATA

BACKGROUND OF THE INVENTION

Field of Invention

The present invention relates generally to the field of data. More specifically, the embodiments herein relate to uniquely enriching mobile objects, location, time, and physical data through an accelerated and distributed system and accessing it through external platforms.

Discussion of Related Art

With the exponential increase of devices, data sources, frequencies, and volumes, previously scattered and fragmented, containing human, sociological, psychographic, geographic, mobility, and economic vectors of data the gradual enablement of data converging into a realm of a cyber-physical reality is taking place. Unseemly related forms of previously inaccessible data and insights can be generated through the fusion of these data sources. Mobile devices through MSISDNs (Mobile Subscriber ISDN) or their MAIDs (Mobile Advertiser Identifiers) emit location data, which are randomly generated alphanumeric strings assigned by the mobile phone's Operating System, under the mobile app users' control. Aircraft and Aerial Vehicles broadcast their ADS-B (Automatic Dependent Surveillance-Broadcast) signals when in flight and grounded to comply with flight regulations. Satellites through their SAR (Synthetic Aperture Radar) detect minerals and vegetation for commercial purposes. Crowdsourced events such as social media and marketplace posts are tagged with locations to provide. Space observatories and HAM radios pick up geomagnetic activities to measure radiation emitted onto the Earth. Central banks publish interest rates and monetary policies across various media. All these data sources have locations in common, either by name, geospatial indexes, or raw coordinates and time. The fusion of these separate and unrelated forms of data and their streams creates newly and previously inaccessible insights and metadata providing the building blocks of a mirrored and recreated digital twin of the planet.

Embodiments of the present invention are an improvement over prior art systems and methods.

SUMMARY OF THE INVENTION

An embodiment herein provides a method for mirroring a digital twin universe through the aggregation of mobile objects and static physical and dynamic data.

The method includes (a) generating a profile of the mobile object or groups of mobile objects based on location visits, aggregation of multiple location visits, journeys and frequencies of the visits by coordinates, location names and time, either through predefined or user defined geometric shapes; (b) aggregating and segmenting device applications, mobile object transmissions by language, hardware/software details, device application and transmissions per mobile object; (c) cross analyzing mobile objects across a group or groups of mobile objects stored in a data store to generate mobile object segments; (d) enriching the historical and current state of the mobile object with unrelated data sources through a datastore (e) enriching the data store through geometric shapes and assigning location, time and object features through spatial algorithms (f) providing a mirrored reality of mobile objects and their interactions with other objects, physical and digital planes; (e) generating a digital twin universe to mirror a cyber-physical reality to be displayed on a user interface (f) querying, controlling and transmitting the historical and real time data across platforms; (g) mirroring and simulating iterations of the digital twin universe through algorithms.

In all embodiments, the mobile object location is pre-computed through location, event, and timestamp emissions by the system.

In all embodiments, the data fusion takes place across all raw data sources.

In all embodiments, the mobile object's journeys are aggregated across all locations, events, and timeframes by the system.

In some embodiments, the mobile object's reaction to datastore variables is displayed across user interfaces and maps.

In some embodiments, the enriched data is queried on a datastore through open source, licensed, publicly available, or commercially built tools, APIs, user interfaces, and query interfaces.

In some embodiments, the enriched datastore is queried with pre-built rules to generate charts, location-based, event-based or time-based, time series graphs, and network graphs.

In another aspect which when a query is executed across the data store output of mobile object is displayed in user-defined timeframes (a) generating an aggregation of date time intervals of second, minute, day, month, year; (b) generating an aggregation of previous location visits; (c) generating an aggregation of mobile transmissions of the mobile object; (d) generating an aggregation of location combinations either user-defined or pre-defined; (e) building profiles or segments of the mobile objects through categories of mobile transmissions, interactions across locations, interactions across events, interactions across time and interactions across other mobile objects; (f) selecting these profiles and segments across locations and regions together or uniquely across a predefined or user-defined location; (h) comparatively displaying multiple locations or groups of locations across categories; (i) assigning scores across purely by location (latitude, longitude) or across locations with time variables (latitude, longitude, timestamp); (j) inferring socioeconomic and psychographic profiles and segments across pre-defined or user-defined locations; (k) generating mobile object lifecycles and life logs (l) utilizing the aggregations for machine learning, statistical learning, deep learning, evolutionary algorithms, artificial lifeform algorithms, and cellular automata.

In one embodiment, the present invention provides a method comprising: (a) generating a profile of a mobile object based on location visits, aggregation of multiple location visits, journeys and frequencies of the visits by coordinates, location names and times, either through pre-defined or user-defined geometric shapes; (b) aggregating and segmenting device applications, mobile object transmissions by language, hardware/software details, device application, and transmissions by the mobile object; (c) cross analyzing the mobile object across one or more groups of mobile objects stored in a data store and generating mobile object segments; (d) enriching the historical and current state of the mobile object with unrelated data sources through the datastore; (e) enriching the data store through geometric shapes and assigning location, time and object features through spatial algorithms; (f) providing a mirrored reality of mobile objects and their interactions with other objects, physical and digital planes; (g) generating a digital twin universe to mirror a cyber-physical reality to be displayed on a user interface; (h) querying, controlling, and transmitting historical and real-time data across platforms; and (i) mirroring and simulating iterations of the digital twin universe through one or more pre-defined algorithms.

In another embodiment, the present invention provides a method comprising: (a) generating an aggregation of the following: (1) date-time intervals of a second, minute, day, month, and year, (2) previous location visits, (3) mobile transmissions of one or more mobile objects, and (4) either user-defined or pre-defined location combinations; (b) building profiles or segments of the one or more mobile objects through categories of mobile transmissions, interactions across locations, interactions across events, interactions across time, and interactions across other mobile objects; (c) selecting built profiles and segments across locations and regions together or uniquely across a predefined or user-defined location; (d) comparatively displaying multiple locations or groups of locations across a plurality of categories; (e) assigning scores purely by location (latitude, longitude) or across locations with time variables (latitude, longitude, timestamp); (f) inferring socioeconomic and psychographic profiles and segments across the pre-defined or user-defined location; and (j) generating mobile object lifecycles and life logs utilizing the aggregations for machine learning, statistical learning, deep learning, evolutionary algorithms, artificial lifeform algorithms, and cellular automata.

In yet another embodiment, the present invention provides a method for enriching a profile through matching them across static and dynamic location data, latitudes and longitudes and timestamps, the method comprising: (a) generating a parent location of the profile by identifying the associated parent location across all parent locations where the profile falls within; (b) generating the child location of the profile by identifying the associated child location across all child locations under the hierarchy of the parent location where the profile falls within; (c) generating the grandchild location of the profile by identifying the associated grandchild location across all grandchild locations under the hierarchy of the child locations where the profile falls within; (d) updating profile or segment: (1) across the parent locations, child locations, and grandchild locations at same level of hierarchies, or across hierarchies; (2) across time ranges by parent location, child location and grandchild location at a specified time range or across time intervals; (f) building scores by selecting, creating, and generating features in supervised or unsupervised manner by retrieving hierarchies of locations, or combining all parent, child, grandchild locations; (g) enriching profiles, segments, and hierarchies fusing the profiles and segments across other sources of profiles or their hierarchies through pre-defined or machine-defined rules; (h) generating profile lifecycles through aggregation of profiles by parent, child and grandchild locations varied through time ranges and intervals; (i) generating location lifecycles through aggregation of locations by parent, child and grandchild locations varied through time ranges and intervals; (j) generating event lifecycles through aggregation of events by parent, child and grandchild locations varied through time ranges and intervals; (k) combining profile, location, and event lifecycles through hierarchies or across hierarchies of profiles as segments, locations, and time; (l) inferring profile lifecycles reaction across locations, locations lifecycle across events, and event lifecycles across profiles; and (m) generating profiles across unique identifiers, groups of identifiers or segments associating mutual locations, relationships, mutual events, or locations.

These and other aspects of the embodiments herein will be better comprehensible by the way of drawings and explanations and are not of any limitation. Modifications may be made within the embodiments without diverging from general concepts of data fusion across moving objects, location, and event-based data.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 6A-6B depict flow diagrams for associating profiles with hierarchies of location according to the present invention.

DESCRIPTION OF THE PREFERRED EMBODIMENTS

Figure 1:
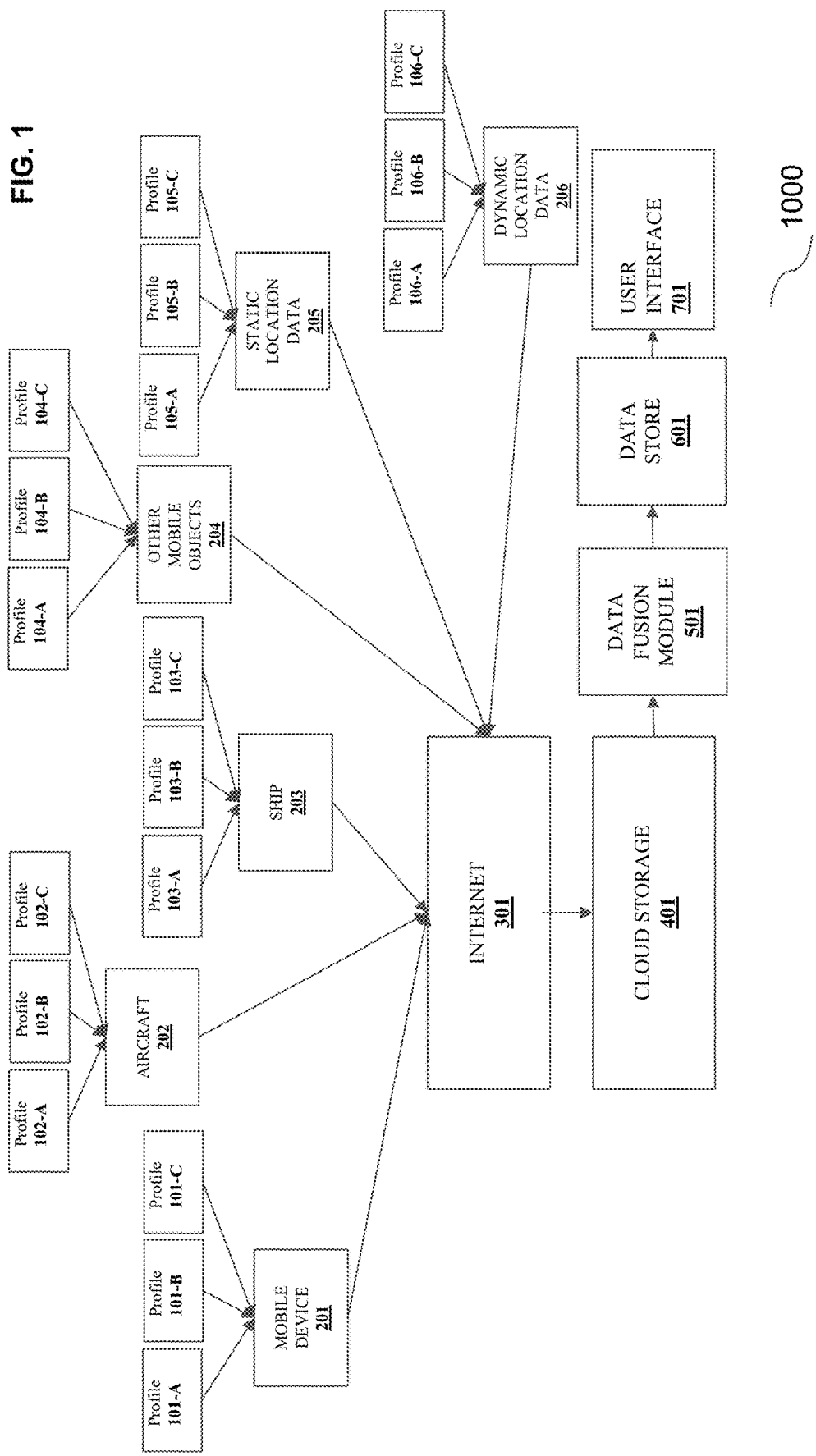
FIG. 1 illustrates the schematics of multi-sourced data aggregation over the internet either through publicly available or partnered data sources and displayed after the data fusion process through a user interface according to some embodiments of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

FIG. 1 is a schematic illustration of a system 1000 for collecting multiple sources of mobile object data 101A-C, 102A-C, 103A-C, sources of static location data 104, and sources of dynamic location data 105. 101-A is a profile associated with a mobile device, 101-B is profile associated with another mobile device, and so on, where 101-N may represent the remainder of the mobile devices. In FIG. 1, the uniqueness of mobile devices is represented under their collective category of 201. 101-A may be an iPhone® XR with a different ID, 101-B may be a Xiao Mi®, and 101-C may be a Samsung® Galaxy device, which belong to different unique profiles, but are categorized under Mobile Device 201. A similar analysis applies to the collective categories represented by "Aircraft" 202, "Ship" 203, "Other Mobile Objects" 204, "Static Location Data" 205, and "Dynamic Location Data" 206. In this context, Mobile Object Data refers to a mobile object emitting location data over the Internet, where such Mobile Object Data includes location coordinates and time stamps. "Static Location Data" refers to locations that do not move (they may be city borders or buildings themselves), where such "Static Location Data" may be represented as points, lines or polygons on a map (geometric shapes). "Dynamic Location Data" refers to locations that do move (they may include river paths, glacier movements, land-filled human-made creations, real-time forest fire locations), where such "Dynamic Location Data" may be represented as a point, line, or polygons on a map (mainly relating to natural land formations

102-A may be a cargo plane, such as Airbus® Beluga (unique tail number for example. A7-BGA), 102-B may be a passenger plane, such as Airbus® A320 (unique tail number), and 102-C may be a private jet such as Gulfstream® G700 (unique tail number), which are collectively categorized as 202 Aircraft.

103-A may be a deep oil drill ship (for example, MAERSK® VALIANT), 103-B may be a cruise liner and 103-C may be an oil tanker (for example, YM® VENUS).

105A-C may be data relating to shopping mall coordinates for 201 mobile devices, airport coordinates for 202 aircraft, or seaport coordinates for ships 203.

Dynamic location data 206 relates to location data that changes, i.e., appears or disappears over time (predictable events (public holiday timestamps, concerts, football matches) and unpredictable events (earthquake), data related to forest fires in X location that move toward Y location, etc. The importance of matching all this is to create profiles such as private jet owners (unseemly related profiles), etc. within the data store 601.

Data from various data sources (201 (from a mobile device), 202 (from an aircraft-based data source), 203 (from a ship-based data source), 204 (from other mobile objects), 205 (from a static location data source), 206 (from a dynamic location data source)) containing, for example, location and time data, is aggregated and segmented across their categories, where the aggregated data is collected via the Internet 301 and stored in a cloud storage architecture 401 (such as object storage services, data lakes, lake houses, data warehouses) where such stored data is accessible via a data fusion module 501. As used herein, the term "aggregated" means, collected under a category (such as 101-A to C collected as mobile device), while "segmented" across their categories means, if 101-A is an android device it is segmented (at the data store 601) together with other android devices.

Aggregated data is matched through various spatial, geospatial, and spatiotemporal algorithms and is sent into a data store 601 (e.g., columnar or non-columnar RDBMS database system, non-database in memory or out-of-memory data stores, etc.). User interface 701 provides access to data in data store 601 over the Internet (or, alternatively, via a local area network (LAN)). For example, a query may be submitted via interface 701, the results of which may be displayed to an end-user. Matching in different scenarios may require different approaches, e.g., spatial algorithms may match a mobile device to a building (e.g., shopper/customer), geospatial algorithms may match mobile device to a land type such as a glacier (e.g., geologist) and spatiotemporal algorithms may match a mobile device at a location at a specific day-time (e.g., football watcher).

The term mobile object data refers to any device transmitting coordinates and timestamps Mobile device data 201 represents Mobile Subscriber ISDN (MSISDN) data retrieved through cell towers of telecom operators or Mobile Advertiser ID (MAID) data collected through mobile applications, where non-limiting examples of such mobile devices include cell phone devices, machine-to-machine (M2M) devices, IoT devices or SIM-controlled drone/equipment. Data collected from such devices include, but are not limited to, latitude, longitudes, cell tower IDs and timestamps, SIM card details, mobile application usage, and mobile application lists. Elements 101A-C represent individual profiles that share the location data that was collected through (but not limited to) call data records (CDRs) and mobile application software development kits (SDKs). Element 202 represents aircraft/unmanned aerial vehicle (UAV) signals transmitted via Automatic Dependent Surveillance Broadcasts (ADS-B) collected by radio hobbyist networks or commercial satellites. Elements 102A-C represent aircraft profiles identified through unique identifiers (e.g., tail/flight numbers). Non-limiting examples of location data transmitted include, but are not limited to, latitude, longitude, and timestamps.

Element 203 represents Automatic Identification System (AIS) signals transmitted by, for example, ships, container ships, drill rigs, tug boats, fishing boats, and exploration craft, where such signals comprise any of the following: latitude, longitude, and timestamps, and where such data is associated with a uniquely identifiable profile 103A-C.

Other mobile objects 204 include moving objects that include a control mechanism through SIM cards, such as moving Internet of Things (IoT) type devices.

Element 205 represents static location data such as point coordinates of a location, name, feature, latitude, longitude, or one or more groups of points, each representing a point of interest or areas of interest and having coordinates that form a polygon, multi-polygon, or line which. 'Feature' here represents geographic or urban features such as building details, elevation, etc. The 'Name' represents the name of the point (e.g., as traffic stop name, name of the polygon such as city name, name of the line such as street name, etc.). 'Urban' here refers to human-made constructs while 'geographic' names are naturally occurring features. Uniquely identifiable static locations are represented as unique profiles 104.

Dynamic location data 206, random but updated in nature, represents updated geometric shapes (mentioned previously) that are updated in data sources that infer events such as geometries derived from satellite imagery, mass human activity, social media posts that include latitude, longitude, timestamps (or generalized as locations of cities, districts, and other administrative levels) etc. Geometric shapes include shapes such as points, lines, and polygons. For example, an ATM may be a point (has one coordinate), a road may be a line (has 2 coordinates) and a polygon may be a building (has more than 3 coordinates). These shapes may be updated; for example, the ATM may be converted from an HSBC® bank ATM to a Natwest® bank ATM, same for polygons where a Walmart® may convert to an Amazon® warehouse. Both the name of the shape (Walmart® to Amazon®) and the structure of the shape may change over time (airport adds new terminal), or newly created buildings may be added to the static location data 205 as a new profile 104-A. Every country has its administrative levels or structure. A county in one nation may be a state in another. Some countries don't have neighborhoods but address them as Postal Codes. The phrase used above—'Random but updated in nature'—means that this data is always emitted from devices. These devices don't typically have a consistent pattern of emitting location (always different coordinates but data is always collected). Such data collected in the cloud storage system 401 may be shared across the Internet 301 where such sharing is commercially motivated or is done in an open-source or crowd-sourced manner.

Data fusion module 501 combines latitude, longitude, and timestamp data at various dimensions. All profiles are matched across a unique latitude and longitude. The dimensions are a visual representation (for our perception) of layers of data combined through latitude and longitude, independent of time. A coordinate (latitude, longitude) may imply a ship, a mobile device, and a port at the same time are matched together because they appeared at the same location. For example, data fusion module 501 combines the previously described AIS data (associated with "Ships" element 203 in FIG. 1 and its associated profiles stored in profiles 103A-C) with the previously described MAID data (associated with "Mobile Device" element 201 in FIG. 1 and its associated profiles stored in profiles 101A-C) to create a new profile for a sailor in a ship or oil tanker, for example, through geometric and spatial algorithms. The algorithm to match the mobile device with the ship will be a point-in-polygon algorithm (the point is the mobile device, and the polygon will be the ship itself in 2D. The point-in-polygon is a spatial/geometric algorithm. Rule-based algorithms such as if a mobile device falls within a ship (2 layers combined), handled by the data fusion module 501, may imply the profile is a sailor or passenger, in reverse, a ship with passengers, to be stored in the data store 601. Such algorithms enable the combination of profile data in 101A-C (representing profile data associated with a mobile device associated with a given sailor) and 103A-C (representing profile data associated with a ship or oil tanker associated with the same sailor), whereby the data fusion module 501 conducts additional statistical analysis and inference across their interactions to create new insights and new data referred to herein as "enriched data." For the ship and sailor example above, a sailor that visits other ships which are only oil drill ships, this sailor would further be tagged as an oil worker. The data store 601 provides a library where such enriched data may be accessed via user interfaces 701. Such interfaces could be implemented via Structured Query Language (SQL) editors, JavaScript (JS), HTTP POST, API, query builders, mapping tools, business intelligence (BI) tools, and external platforms (either open-source, in-house built, licensed on-premise, or on a cloud).

Figure 2:
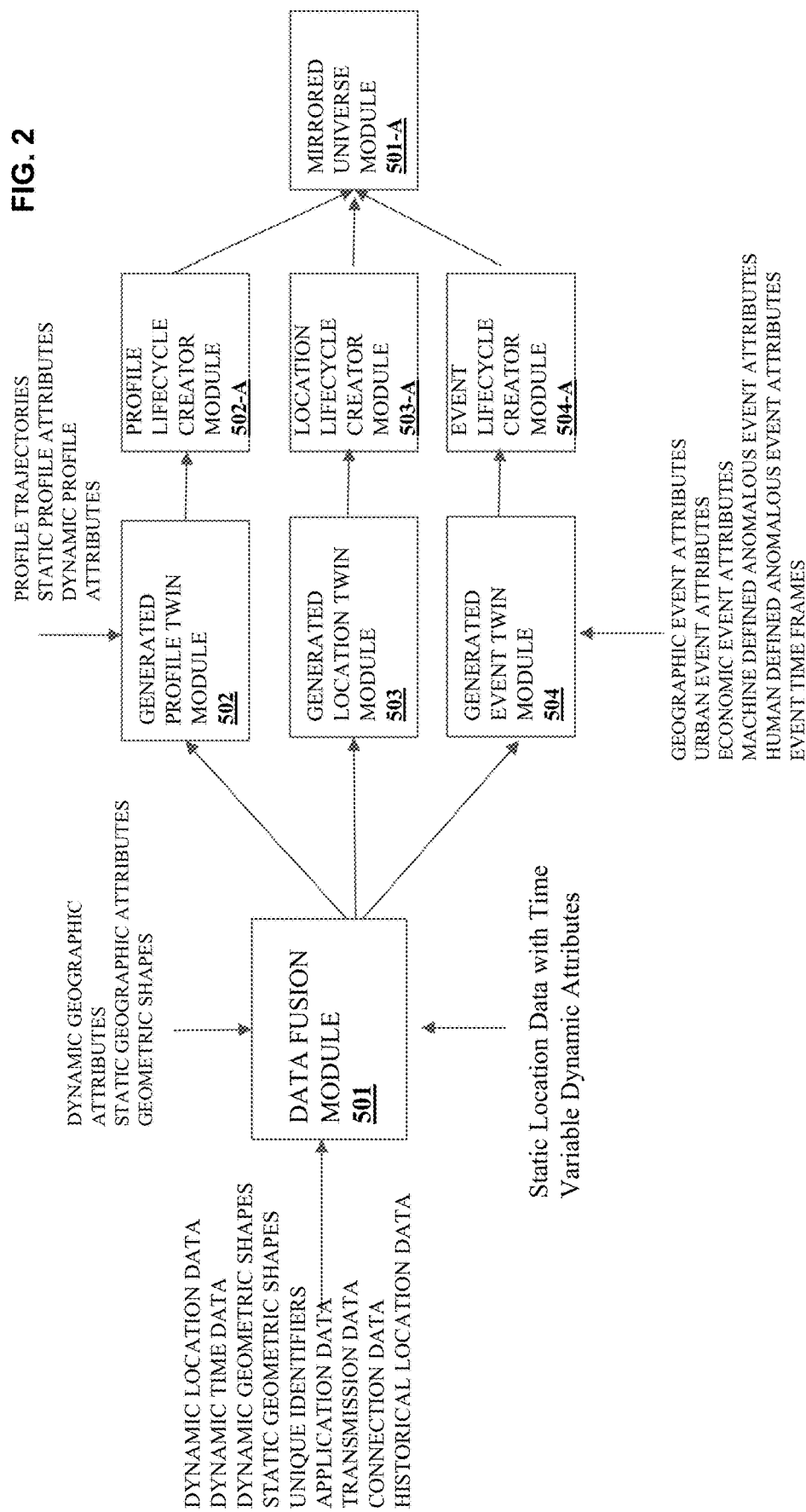
FIG. 2 illustrates the schematics of the data fusion module in FIG. 1 creating a digital twin profile module, a digital twin location module, and a digital twin event module according to the present invention.

FIG. 2 depicts a block diagram displaying the functionality associated with the data fusion module 501 that is used to create a mirrored universe module 501-A. The data fusion module receives, as input, data from elements 201, 202, 203, 204, 205, and 206 of FIG. 1, where such data may include dynamic location data, dynamic time data, dynamic geometric shapes, static geometric shapes, unique identifiers, application data, transmission data, connection data, historical location data, etc. Digital twin modules are used to represent an aggregation of time across "profiles", "times" and "events". For example, a generated profile twin module 502 is used to represent time across profiles, a generated location twin module 503 is used to represent location across profiles, and a generated event twin module 504 is used to represent time across events. Generated profile twin modules are created by the system at t=0 (runtime) and constantly maintained and fed, other digital twins may be created and fed data in parallel, therefore generated on demand. "Represent" here means displaying them on the user interface 701 as charts, statistics, maps, etc., as designed by the instruction builder 1001. "Representing" locations across profiles is can be seen at FIG. 7Q, or representing locations and time across profiles at FIG. 7L, FIG. 7O and FIG. 7P. Representing locations across profiles, without time can be seen at FIG. 7N (no time range as it is a pie chart) and FIG. 7M (no time range as it is a network graph). Other examples for representing time across profiles, can be equivalent to showing travel paths of summertime vacationers (British tourists visit Spanish beaches, while Dutch tourists visit Turkish beaches), representing location across profiles can be equivalent to displaying demographics of customers across a Walmart® (students in the weekend, white-collar within the weekday). Representing events across profiles is equivalent to the number of football matches, concert visits, and factory visits across profiles.

The data fusion module 501 can export an output such as a map showing the footprints of a mobile device across a city or countries (its overall movement across streets and buildings) while showing its car ownership status in different colors or as Yes or No across the map (think as a 3D profile, both moving and changing its ownership, income, etc. across time). Another case may be that the overall features tagged with the profile (car owner, vegan, summer vacationer, etc.) can be displayed as statistics. These cases are for the 502 module. The data fusion module 501 can export output such as a cumulative map of all the profiles as seen at motorways in FIG. 7I or for a whole area of interest or a city at FIG. 7J, this can be filtered historically or displayed in real-time. For generated location twin module 503, an example may be a real-time location replica generated at Times Square, tourists appear, tagged as Chinese, vegan, and high income, and their profiles are accumulated within the location twin module and stored. The output of the data fusion module 501 across 504 may be represented as a time series in FIG. 7L as road constructions and traffic jams affecting road visits, grouped by road names.

Each of the digital twin modules (i.e., 502, 503, and 504) provides its output to a feed lifecycle creator module (i.e., 502A, 503A, and 504A, respectively). For example, in the case of profile twin module 502, the profile lifecycle generator module 502A creates a trajectory of profile visits, visit sequences, visit intervals, profile visit preferences, mobility patterns, location affinities, and retentions of a profile across locations. With respect to mobile devices 201 in FIG. 1, profile twin module 502 allows for the creation of loyalty indices of phone owners to a location or location category such as a brand. With respect to aircraft element 202 in FIG.

1, profile twin module 502 allows for the creation of aircraft profiles based on the number of visits to an airport. With respect to ship element 203 in FIG. 1, profile twin module 502 enables profiling ships in frequencies to a port to determine trade routes.

Location lifecycle creator module 503-A enables detecting loyalty scores aggregated at the location digital twin module 503. If a profile visits a location more than once or in specific intervals then loyalty of the profile can be generated or scored. A mobile device 101-A visits a Walmart® (104-A) in FIG. 1, 4 times a month until June 2022, without visiting any other supermarket; then in July 2022, the mobile device starts visiting Costco®, without visiting. Walmart® again, then the retention or loyalty to Walmart® 104-A decreases with the mobile device 101-A, and when aggregated with all mobile devices 201 at FIG. 1, the total loyalty to Walmart® decreases (aggregated here is the summing of all the Walmart® visitors across its competitors). Being able to analyze this, is enabled, through the location digital twin module 503-A accessing the mirrored universe module 501-A, either prebuilt at the data fusion module 501, or human-defined through the instruction builder 1001 (writing a churn or loyalty SQL script) on the user interface 701 at FIG. 5. In the case of the generated location twin module 503, a digital mirror of a location is created through the 503-A location lifecycle creator module which creates a location lifecycle for a given location based on historical data or real-time data, where historical or real-time data associated with the location lifecycle may be any of, but not limited to, the following: temperature, humidity, air pollution, sound pollution, social media posts across the location (that may include happiness, stress, income level data that may imply psychographic and socioeconomic data and the change. The demographic breakdown (income level, age, car ownership) changes over time per mobile device. The changes in profile visits can be seen; for example, during discount days/clearance sales take place in an average-income shopping mall, then low-income profile visitors may be attracted to a location and that this can be viewed at the user interface 701 at FIG. 5 through the generated location twin module at 503, wherein such data is matched with the profiles of mobile devices 201 of FIG. 1. Determining such correlation via the location twin module 503 and location lifecycle creator module 503-A allows the identification of whether a specific mobile device owner may choose a location just due to low decibel sound pollution.

Geographic event attributes, urban event attributes, economic event attributes, machine-defined anomalous event attributes, human-defined anomalous event attributes, and event timeframes are input to the event lifecycle creator module 504-A. These inputs are ingested into the event twin module. They are external sources of information that are added to 504 so that correlations can be observed (through the user interface 701 at FIG. 4), for example, an increase in interest rates may cause a drop in low income visitors to a shopping mall. Geographic event attributes include, but are not limited to, earthquake, flood, hurricane coordinates, timestamps, groups of coordinates (such as polygons or multipolygons), etc. Urban event attributes include, but are not limited to, accidents, sound pollution, and other human-created events that are not statically anchored on a location but are, rather, dynamic in nature. The categorization of lifecycles via profile twin module 502, location twin module 503, and event twin module 504, along with the combination of corresponding profile lifecycle creator module 502-A, location lifecycle creator module 503-A, and event lifecycle creator module 504-A allows for the consolidation of such outputs into a mirrored universe module 501-A, where profiles, locations, and/or events are tracked and assigned a lifecycle, along with mirroring of life cycles of systems (such as elements 201, 202, 203, 204, 205 and 206 of FIG. 1) across the globe. "Mirror" in this application refers to the real-time and historical recreation of locations, times, and events that can be rewound, reiterated, backtested, or simulated with changing variables across the lifecycles. Examples of stimulating include playing with interest rates (other sources of data as variables and experiment to outcomes), to simulate the reaction of visitor counts to a shopping mall (will they increase or decrease). Examples of changing variables include playing with temperature and humidity to see the reaction of visitors to a beach. Examples of backtesting include setting an end goal, e.g., maximum visits to Florida beach, and find the combinations required, such as 35 degrees Celsius, 0 knot wind speed, 0.1% fed funds rate, 2% credit card rate, etc. (essentially simulating an end goal, and finding the combinations required to reach it).

As an example, mobile device profiles 101-A, 101-B, 101-C associated with mobile device element 201 in FIG. 1 are enriched through the data fusion module 501 (of FIG. 2) that enables analysis of scenarios such as visitors of an ice-cream shop (via profile life cycle creator module 502-A) who have visited beaches (via location life cycle creator module 503-A) during the winter season (via event life cycle creator module 504-A). To rewind and view the scenario in the summertime, the mirrored universe module 501-A allows viewing the interactions backward in time or lifecycles of the location.

Figure 3:
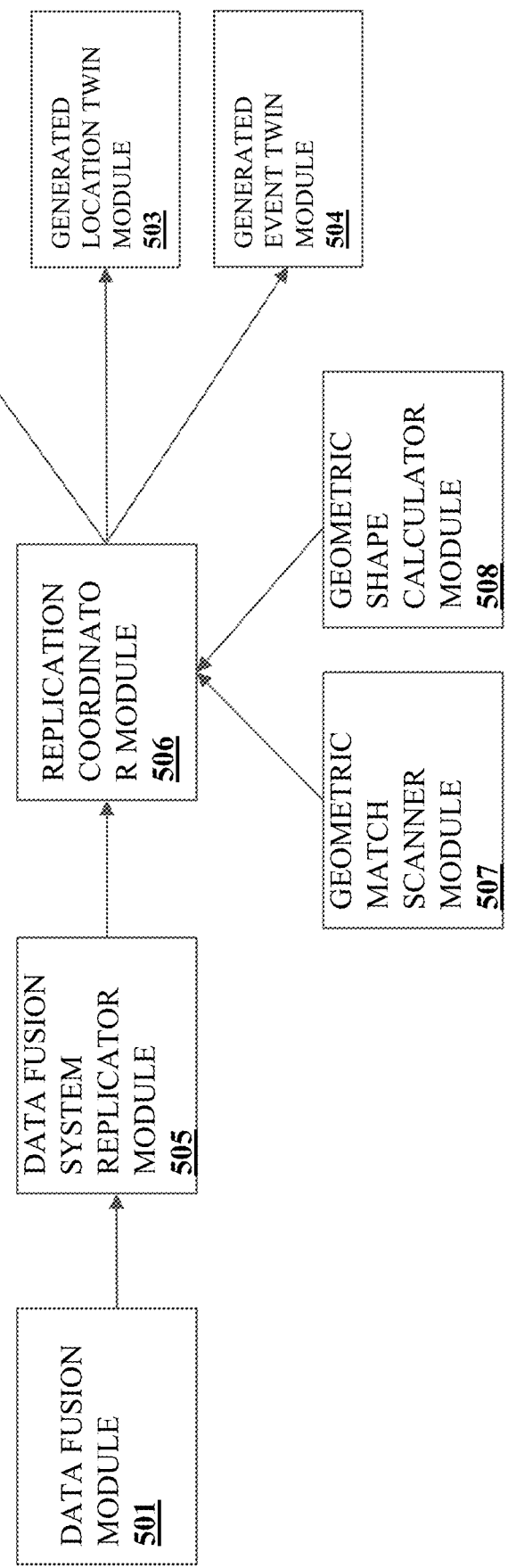
FIG. 3 illustrates the schematic of how the data fusion module in FIG. 2 creates a generated profile twin, generated location twin and a generated event twin module is created according to the present invention.

FIG. 3 is an illustrative diagram of how the profile twin module 502, the location twin module 503, and the event twin module 504 are scaled for increased processing power and accelerated geometric calculations. The data fusion module 501 can be represented as a server (or its replicable machine image) that downloads and reads the data stored on the cloud storage 401. This server includes one, or a combination of GPUs, CPUs, TPUs, etc. and utilizes them to run spatial, geospatial and spatiotemporal algorithms for data fusion purposes. These algorithms to be run, are enabled through a combination of various software libraries combined together within the same server. In FIG. 3, the data fusion system replicator module 505, replicates 501 in order to increase capacity. 501 is a combination of resources required for the fusion, however, 505 is a module that recreates and copies resources so that much larger volumes of data can be handled. The replication coordinator module 506 controls and sends tasks in parallel chunks across distributed systems, servers, and processors, while coordinating with a geometric match scanner module 507 (which may comprise multidimensional tree search algorithms and geospatial algorithms) and a geometric shape calculator module 508 (which may comprise memory allocation, multithreading, and optimization software and scripts, to efficiently distribute tasks and avoid replications and collisions). The replication coordinator module 506 allows for upscaling and downscaling operations of the machines used for the geometric calculations. Profile twin module 502, location twin module 503, and event twin module 504 are therefore fed with the output of the data fusion module 501.

Figure 4:
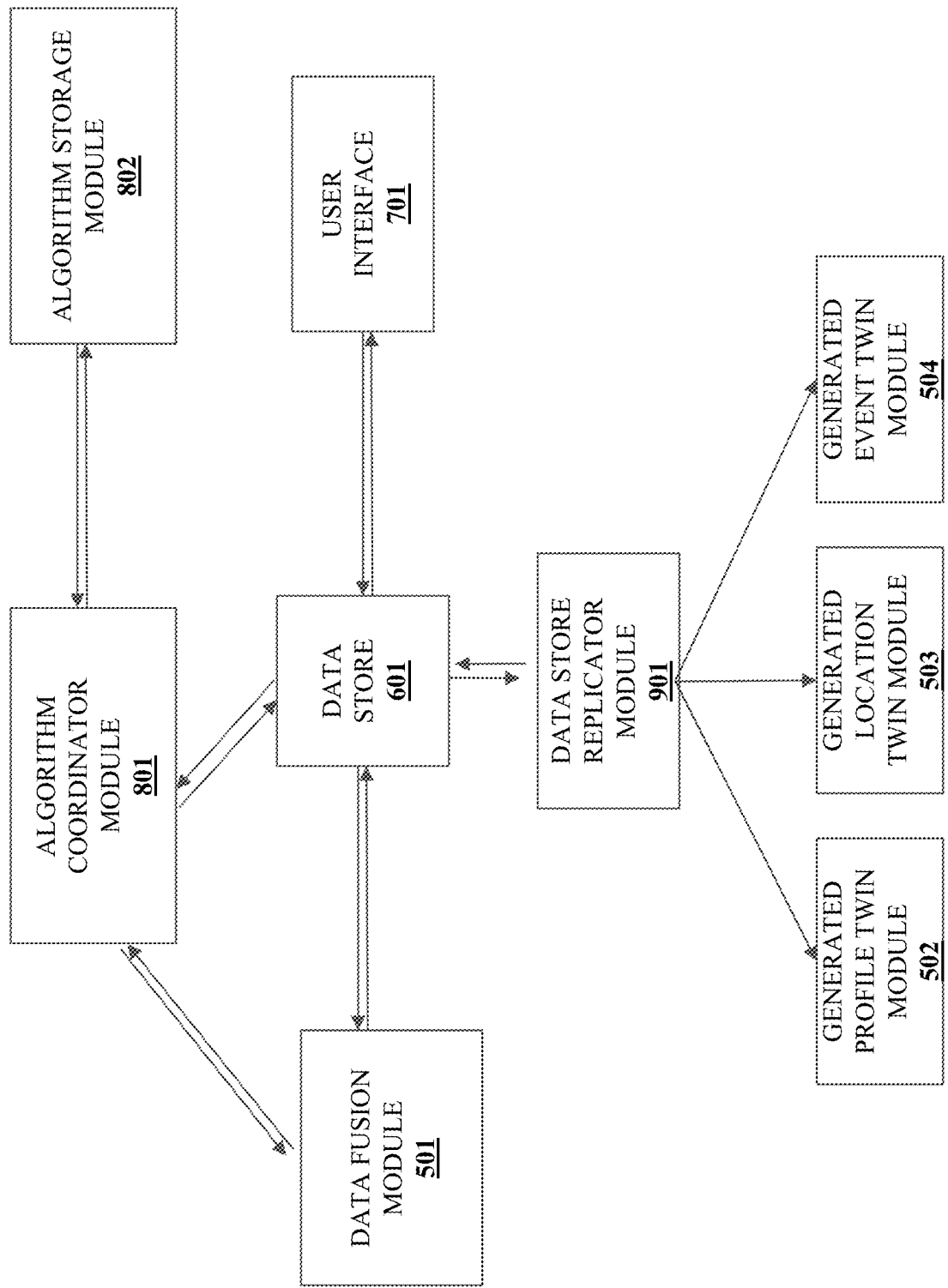
FIG. 4 illustrates a schematic of how the data fusion module in 3 interacts with the data store replicator module and the algorithm coordinator module according to the present invention.

FIG. 4 illustrates an interaction diagram between the data store 601, the data fusion module 501, the user interface 701, algorithm coordinator module 801, and the data store replicator module 901. The data store 601 messages its existence and current state to the data store replicator module 901, and communicates its need to scale up or down as adjusted by the size of the datastore and the size of the data ingestion The size of the datastore is directly related to the data ingestion size. The size of the data ingestion is random. For example one day, 1 Terabyte of data is emitted from profiles, while the next day 10 Terabytes. Predefined data size counters or metrics, detect the resource requirements, for example if 10 replicated data stores exceed a data storage limit of 90%, another one is added to make it 11. The data store 601 increases the number of data store replicas through the data store replicator module 901 while in parallel increasing the amount of generated profile twin module 502, generated location twin module 503, and generated event twin module 504. The data store module 601 is capable of triggering the data fusion module 501, the data replicator module 901, the user interface, or the algorithm coordinator module 801.

The messaging system between the user interface 701 and the data store 601 can be described with the following tasks. The user via the user interface 701 can query the datastore 601 (through, for example, an HTTP POST query, a native query in JAVA™, a database languages query such as a SQL query, etc.). In response to such a query, the data store 601 sends back results and displays them as one or more dashboards, one or more charts, one or more tables, and statistics Dashboards are designed through a user interface 701. Charts and tables can be built in, with no data at all (i.e., they are empty to begin with), once the data starts being ingested as historical and real-time, these charts and tables start changing dynamically. More than one dashboard can be created on the user interface, one that only analyzes mobile devices at airports, another that displays maps of mobile devices on railway networks. If no data is returned or an error takes place, an error message is sent to the user interface 701. The user interface 701 can store pre-calculated queries to be run in real-time. These are time-independent SQL queries saved on the user interface. Metrics may be pre-calculated, for example a visitor/hour metric can be designed and once real time data is ingested, the user interface will always display the visitor/hour output in real time, or historical if required. The data store 601 can also communicate the size and segments (i.e., data store time segment) stored within its store back to the user interface. Segment here refers to data store time segment that may be segmented by time intervals, minutely, hourly, or daily. The data size can be viewed at the user interface 701 and whether this data can only be accessed in minutes, hours, etc. (depending on the level of granularity).

When a query (or queries) at the user interface requires heavy resource requirements (e.g., when the user interface is used for heavy amounts of queries or when the output of the user interface is estimated to be large). A machine is replicated into multiple machines in order to handle high resource requirements. This can be predicted by a set time limit, for example, if a query does not respond within 15 seconds, extra machines or replicas are fired-off, where the query is further distributed, the data store 601 communicates such resource requirements to the data store replicator 901 which identifies if any readily available instances of replicated generated profile twin module 502, generated location twin module 503 or generated event twin module 504 is currently online. When no such instances are currently online, the necessary number of replicas of generated profile twin module 502, generated location twin module 503, and generated event twin module 504 are generated to perform the user interface 701 triggered tasks (corresponding to the query or queries input into the user interface 701). Assuming that on average a query to the system should return results in 15 seconds, if the query does not return a result, 1 machine turns into 2 machines, if there still is no response these machines increase to 4 until an error such as no data found is returned.

Data store 601 can also be triggered by the data fusion module 501 when new sources of data streams are ingested into the data store 601. The algorithm coordinator module 801 decides which algorithm will be used by messaging the algorithm storage module 802. For example, when dynamic location data is ingested into the data fusion module 501, a row of data including a unique identifier from 101-A, including latitude, longitude, and timestamp is detected, where latitude and longitude data are in two separate columns. The algorithm coordinator module 801 detects whether the latitude and longitude fall within the boundaries of any dynamic or static coordinates or groups of coordinates by communicating the row and intersecting it with the geometric shapes stored in the data store 601. If the latitude and longitude match any static or dynamic geometric shapes (or groups of shapes), static coordinates (or groups of static coordinates), then the algorithm coordinator module 801, searches which algorithm is required for the data fusion through a library of algorithms from the algorithm storage module 802. For example, when the latitude and longitude fall near a point (proximate as predefined or user-defined in relation to the point), then all profiles (i.e., Profile 101-A-C, 102A-C, 103A-C, and so on) associated with a mobile device 201 is enriched with that point as the algorithm coordinator module 801, recognizes that the latitude, longitude input will be matched with a point and deploy an algorithm, such as but not limited to Ball Tree, KD Tree, nearest neighbor, etc. to match them. Ball Tree will be used when coordinates are on land, KD Tree will be used if the coordinates are above ground. Ball Tree is mobile to ATM machine, while KD Tree is aircraft to mobile device (there is an altitude which makes the algorithm have to search a $3^{rd}$ dimension). When profile 101-A associated with the mobile device 201 falls on a single coordinate or groups of coordinates (such as a polygon), the algorithm coordinator module 801 deploys an algorithm such as point in polygon from the algorithm storage module 802. When there is more than one polygon layered hierarchically across the latitude and longitude input of profile 101-A associated with the mobile device 201, then all the names attached to the polygons are attached to the unique identifier of 101-A, and placed into the datastore 601, and distributed across the generated profile twin module 502, through the data store replicator module 901.

If the data fusion module 501 has dynamic location data ingested through the cloud storage 401 from a source 102-A from the aircraft category 202, then the same process, the unique identifier of the aircraft such as its flight number or tail number, latitude, longitude and, in this case, timestamp, is matched with the unique identifier of the source 101-A through the algorithm coordinator module 801, wherein a point-to-point proximity algorithm is selected (from the algorithm storage module 802) and deployed through the data fusion module 501 and ingested into the data store 601 after both the identifiers are matched. In this manner, both unique identifiers of flight number 201-A and mobile device 101-A are fused together through latitude, longitude, and timestamps. Preset rules such as landed aircraft 201-A and mobile device location 101-A matches allow for increased precision for the identification and enrichment of the mobile device 101-A with the flight number, airline, and tail number to infer the passenger and segment is under a name that can be later queried (or tracked) by the user interface 701. This matched or fused data is allocated under the generated profile twin module 502. If the historical passenger flights and passenger transit networks across a physical location, such as an airport are to be viewed and queried through the user interface 701 then both the generated profile twin module 502 and generated location twin module 503 are accessed through the data store replicator module 901.

It is important to clarify that one of the important functions of the data store replicator module 901 is to scale up the data stores in an efficient manner as well as the computational resources required to access the data. If the user interface 701 requires the correlation or statistical analysis of ticket prices across the passenger transit networks which are generated through the fusion of 101-A and 201-A, then generated profile twin module 502, generated location twin module 503, and generated event twin module 504 are accessed through the data store replicator module 901, as external event data (which may include latitude or longitude or may not) are connectable through the flight number of the aircraft profile at 102-A. In a simulation of ticket price variations with mobile device 101-A sensitivity, to identify price elasticities in demand or any other economic and financial insight, the algorithm coordinator module 801 selects from a library of, but not limited to, statistical learning, deep learning, machine learning, artificial life, cellular automata, genetic algorithm or evolutionary algorithm from the algorithm storage module 802, enriches and generates the output through the data fusion module 501, ingests it into the datastore 601, and allows the output to be viewed, manipulated, adjusted through the user interface 701. Therefore, through the fusion of 101-A and 201-A and the deployment of the algorithm storage module 802, the price elasticities of demand of passenger audiences across airlines can be simulated as (but not limited to) charts, dashboards, network graphs, maps metrics, real-time reports, historical reports, either in timely schedules or alert based defined by the user interface's users across and through the user interface 701.

Figure 5:
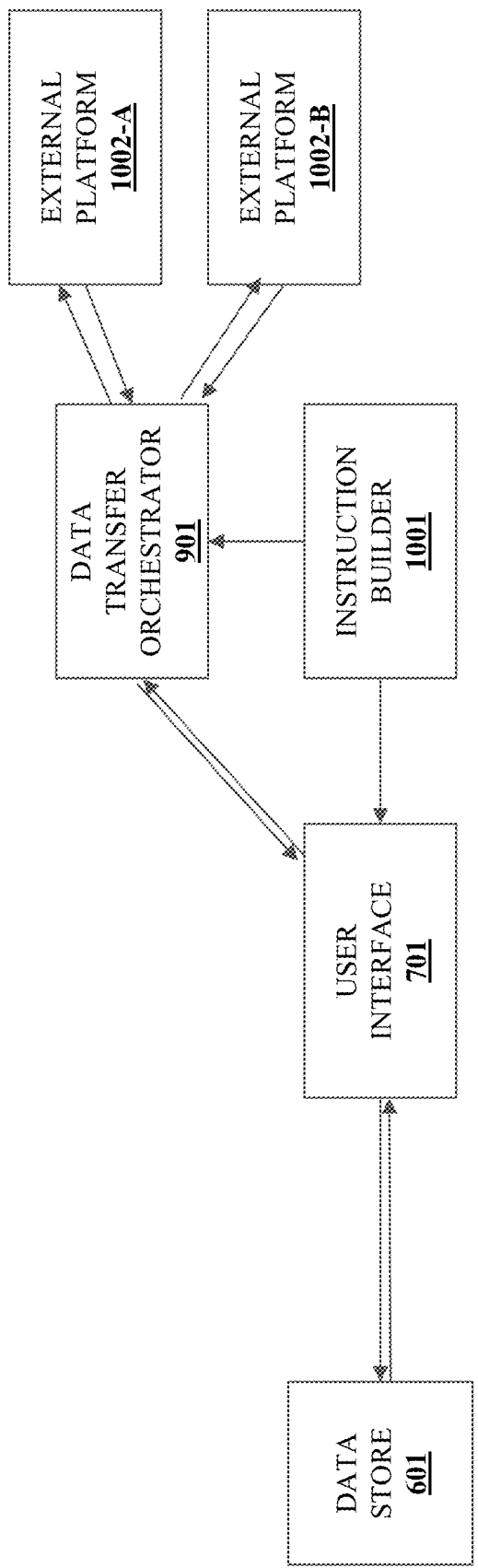
FIG. 5 depicts a diagram of how the data store in 4 interacts with the user interface to transfer and broadcast data to external platforms according to the present invention.

FIG. 5 illustrates an interaction diagram demonstrating how the user interface 701 accesses the data transfer orchestrator 901 and the data store 601 through the instruction builder 1001. JavaScript™ (JS) or React JS libraries (or extensions) may be used to enable the front-end at the user interface 701 to manage queries sent to the data store 601, and to receive analysis, statistics, charts, and lists of unique identifiers which are categorized and transferred to servers across the internet either through APIs, SFTP addresses or object storage locations through the data transfer orchestrator 901 which uploads the lists of unique identifiers across different platforms such as DMPs, SFTP servers, object storage platforms externally located from the system 1002-A and 1002-B. Data transfer orchestrator 901 orchestrates whether the query should return charts (for analysis) or lists of unique IDs. Charts are for insights, while unique IDs are advertising IDs that are uploaded onto social media and ad networks (most of them are DMPs, SFTP servers, AWS S3 storage buckets, etc., that match them with Facebook®/Instagram®/Twitter® profiles). External platform 1002-A may match the unique lists with the pool of unique lists located on the external platform to further enrich the data originating from the data store 601. The instruction builder 1001 is a user interface widget that enables SQL queries to be built, without raw SQL codes. The SQL query can generate a list of unique IDs, or a time-series line chart (pie chart, map, etc.). The report builder (instruction builder) widget builds the SQL code in a no-code manner (this is a react js solution). The instruction builder widget displays SQL queries and their attributes as blocks, nodes, and connections (flows). These enable end-users to build complex SQL queries, without them having to know the SQL language. These are considered as front-end software/libraries/widgets. The data transfer orchestrater, coordinates which external platform the list of unique IDs generated will be sent to. It coordinates the delivery of lists of unique IDs, for example, the A list will be sent to, for example, Facebook®, but the B list will be sent to, for example, Twitter®. The external platform 1002-B is a server, object storage location, NAS, etc. that may redistribute the unique lists of identifiers across networks or other addresses where a match is made through the unique identifiers if the unique identifier exists across the external platform 1002-B may it be 201, 202, 203, 204 or 205. The external platform 1002-B may be in connection with the initial external platform 1002-A either through a mutual node across a network, not limited to but including ad networks, data management platforms such as Oracle Bluekai, Salesforce Krux, or other data exchanges in the scenario where the unique identifier is not of the category 201.

Figure 6A:
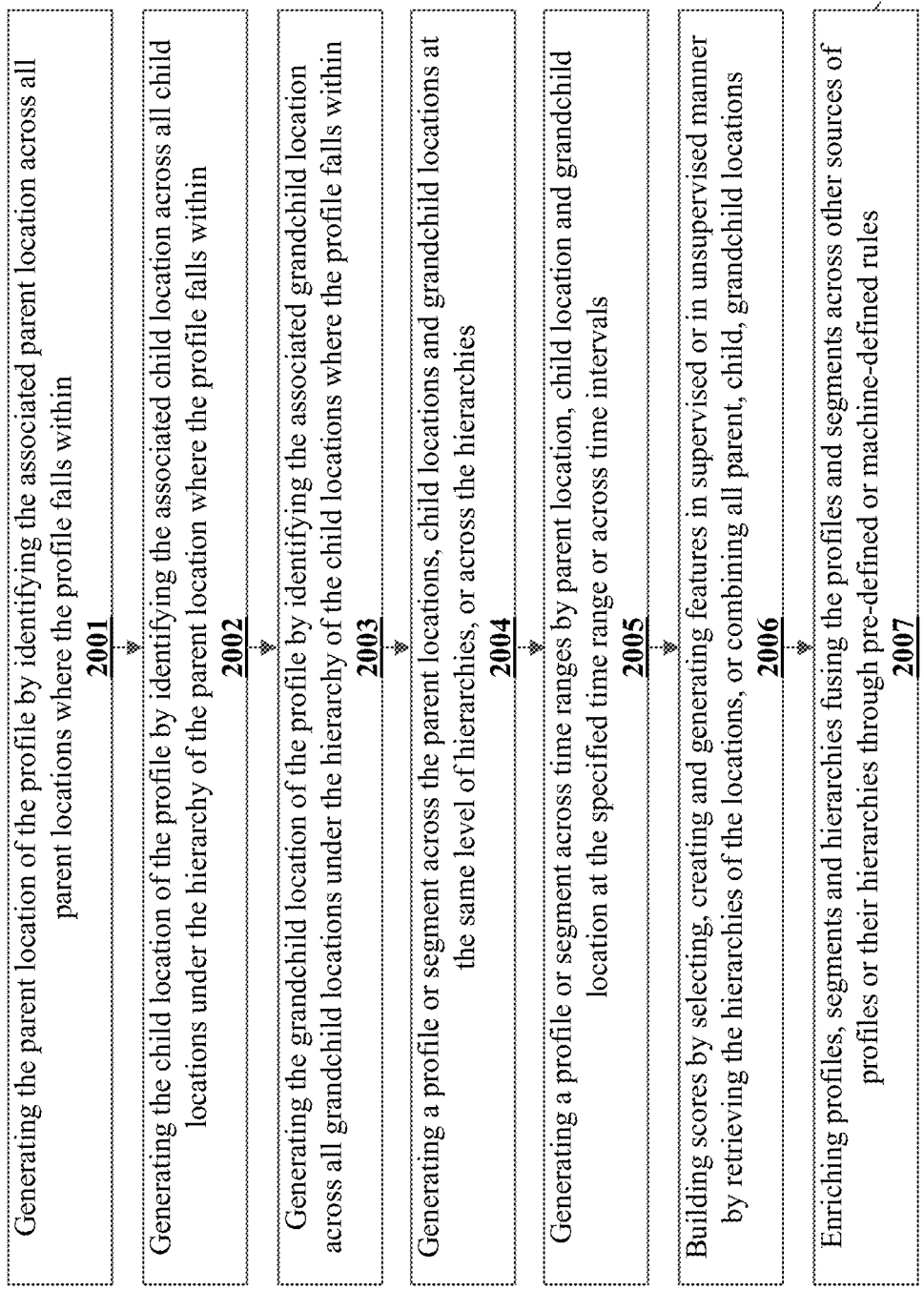

FIG. 6-A and FIG. 6-B are flow diagrams for associating profiles with hierarchies of location, according to one embodiment of the present invention. A profile or a mobile device can belong to a country, district, city, neighborhood, or street, essentially multiple layers of location can be associated with a device or a profile, all together or independently (ID, country or ID, country, district as a row). For example, Seattle belongs to the US, while Berlin to Germany. At step 2001 the method includes generating the parent location of the profile by identifying the associated parent location across all parent locations where the profile falls within. For example, if the mobile device is spotted in a country (US) and is spotted in another country (Bahamas), assuming country is a parent location, then the travel path of the mobile device can be viewed across these two countries, or its travel distribution can be viewed as charts on the user interface 701.

At step 2002 the method includes generating the child location of the profile by identifying the associated child location across all child locations under the hierarchy of the parent location where the profile falls within. If the mobile device is spotted in a city (New York) and is spotted in another city (Florida) later on, then the statistics of the mobile device can include cities visited as New York and Florida (on a user interface or as an ID that has visited both these cities (later to become a white-collar and summer vacationer)).

At step 2003 the method includes generating the grandchild location of the profile by identifying the associated grandchild location across all grandchild locations under the hierarchy of the child locations where the profile falls within. If the mobile device is spotted in an airport, such as Dubai International Airport, and in another airport, Istanbul Airport (both of them have different parents e.g. different countries), then this ID can be displayed in a user interface where both Dubai International Airport and Istanbul Airport will be displayed, or targeted as an ID such as a GCC traveler, Emirates© customer, airline passenger etc.

At step 2004 the method includes generating a profile or segment across the parent locations, child locations and grandchild locations at the same level of hierarchies, or across the hierarchies. At step 2005, the method includes generating a profile or segment across time ranges by parent location, child location and grandchild location at the specified time range or across time intervals. As noted here, the same profile is built step-by-step, initially generating a country it belongs to, a city it belongs to, a district/neighborhood, etc. it belongs to. At 2004, after all the locations are derived (and their country, city, district, etc. hierarchy) for the same profile, the travel journeys are derived for the profile by current location (ID, city, district, neighborhood) and by historical path (across hierarchies as the mobile device travels within countries, cities, neighborhoods, etc.).

At step 2006, the method includes building scores by selecting, creating, and generating features in a supervised or unsupervised manner by retrieving the hierarchies of the locations, or combining all parent, child, and grandchild locations. For example, if the number of hospital visits in Ghana is much greater than the number of hospital visits in Dubai, then Ghana receives a high-risk score for a pandemic outbreak. Building, scores, are done via the data fusion module 501 on FIG. 4, where the scores are ingested into the data store 601 on FIG. 4 for any profile 502, location 503 or event 504. This is managed through the algorithm coordinator module at 801 on FIG. 4, and the scoring algorithm is selected from the algorithm storage module at 802.

At step 2007, the method includes enriching profiles, segments and hierarchies fusing the profiles and segments across other sources of profiles or their hierarchies through pre-defined or machine-defined rules. For example, Mobile Device profile 101-A is matched (data fusion module 501) with Aircraft profile 102-A to enrich the mobile device profile as 'Airline Passenger', or define an Aircraft 102-A as a 'Passenger plane' if all the profiles within an unnamed plane are 'Airline Passenger's. If there is no plane signal present (ADS-B) but all the accumulated mobile devices at a specific location are 'Airline Passenger's then, there must be an aircraft present 202 or an airport present 205 (static location data that may not exist), even if the aircraft has no name or signal (upwards in the hierarchy and pre-defined by a human, or algorithmically detected and machine-defined), please refer to FIG. 1 for this. The profiles 101-A, 102-A, etc., are transferred through the Internet 301, stored at cloud storage 401, and then the data fusion module 501 handles step 2007. The handling part takes place in FIG. 4, where the algorithm coordinator module 801 extracts the required algorithm from the algorithm storage module 802, either utilizing human input rules (pre-defined) or algorithmically detection (machine-defined).

At step 2008, the method includes generating profile lifecycles through the aggregation of profiles by parent, child and grandchild locations varied through time ranges and intervals. For example, mobile device 101-A can be a car owner in January 2022, but not be a car owner in February 2022. A mobile device 101-A can have its car ownership status change over the year and this can be viewed across a time frame (days, months, years). Mobile device consistently visits fuel stations in a month and no longer visits them, even though mobility exists in its movement patterns (visits bus stations, airports, terminals etc., car rental stores). The data fusion module 501 at FIG. 2 analyzes mobile device 101-A profile trajectories across static location data 205 on FIG. 1 and creates a generated profile twin module 502, through the profile lifecycle creator module twin module 502-A so that the mobile device's attributes are constantly updated and to be later ingested into the mirrored universe module 501-A or displayed through the user interface 701 with the correct input on the instruction builder 1001.

At step 2009, the method includes generating location lifecycles through the aggregation of locations by parent, child and grandchild locations varied through time ranges and intervals. For example, a static location profile such as a Walmart® store 205 (poi_name) categorized as static location data 104 on FIG. 1, saw a collapse in the number of visitors during the Covid-19 pandemic during lockdowns. The visitors were Walmart® customers and workers. Before the lockdowns, the distribution of visitors where 95% customers and 5% workers, after the lockdowns where products were only shipped through cargo, the distribution became 0% customers and 100% workers. The number of visitors dropped from 1K/day to 50/day. This represents the location lifecycle of the Walmart® store. The data fusion module 501 at FIG. 2 analyzes location data 205 on FIG. 1 with the mobile devices 101-A, 101-B, and so on, and creates a generated location twin module 503 through the location lifecycle creator module 503-A, to be later ingested into the mirrored universe module 501-A.

At step 2010, the method includes generating event lifecycles through the aggregation of events by parent, child and grandchild locations varied through time ranges and intervals. For example, event 105 from the dynamic location data 206 such as a Dua Lipa concert at the Madison Square Garden in New York on the day 1 Mar. 2022, 21:00 PM local time had 90% US visitors and 10% non-US visitors, while the next concert in Seattle had 99% US visitors and 1% non-US visitors. Every event has its own lifecycle and these distributions can be compared across days, months and years. Events take place at different locations and at different times, but the event itself (Dua Lipa) concert remains static. The data fusion module 501 at FIG. 2 analyzes dynamic location data 206 on FIG. 1 with the mobile devices 101-A, 101-B, and so on, creates a generated event twin module 504 through the event lifecycle creator module 504-A, to be later ingested into the mirrored universe module 501-A.

At step 2011, the method includes combining profile, location and event lifecycles through hierarchies or across hierarchies of profiles as segments, locations and time. This is described in the description of the mirrored universe module 501-A. An earthquake takes place in Tokyo at 13 Mar. 2022, 22:00 PM local time, after 20 minutes, the number of total hospital visits skyrocket from 1000 visitors/day (90% patients to 10% healthcare workers) to 10000 visitors per day (99% patients to 1% healthcare workers), after 3 weeks the total hospital visits in Japan decreases back to 100 visitors per day. Over time, the profiles have changed, but were initially triggered by an unexpected event. This event changed the types of profiles visiting locations. The profile lifecycle creator module 502-A at FIG. 2, the location lifecycle creator module 503-A at FIG. 2 and the event lifecycle creator module 504-A ingests lifecycles collected from the generated profile twin module 502, generated location twin module 503 and the generated event twin module 504, ingests them right into the mirrored universe module 501-A, where this universe can be simulated and analyzed.

At step 2012, the method includes inferring profile lifecycle's reaction across locations, locations lifecycle across events and event lifecycles across profiles. For example, in FIG. 7O and FIG. 7P, the effect of events (Sunday—weekends where all stores are closed in Germany), on visitor counts to Do-It-Yourself stores can be seen with the number of visitors collapsing on the $7^{th}$ and the $13^{th}$ of February. Events such as discount days, clearance sales, radio or geo-marketing campaigns can be associated with peaks. In FIG. 7L, the peaks and troughs of visitor counts are seen on specific days, implying events like road constructions, student exam days, etc., where these events can be detected or viewed across the user interface 701 on FIG. 5. The data store 601 at FIG. 4 accesses the data store replicator module 901, which accesses the generated location twin module 503 and the generated event twin module 504 to display the outputs on the user interface 701 through ready rules designed by the instruction builder 1001 at FIG. 5. The outputs are inferred at step 2012 by human perception and analysis or by alerts on the user interface 701 designed by the instruction builder.

At step 2013, the method includes generating profiles across unique identifiers, groups of identifiers or segments associating mutual locations, relationships, mutual events or locations. For example, a mobile device 101-A consistently visits the same residential building, taking FIG. 7D as an example, then that residential building is identified as the ID's homezone location, and its neighborhood to the country (all details belonging to the location). If a group of mobile devices 101-A etc., visit the same residential building in FIG. 7D, then the group of devices share the same homezone location. If all the unique mobile devices visit hospitals constantly, then FIG. 7G is filled with their visit counts. If they consistently visit hospitals, the group of devices are health workers.

Figure 7H:
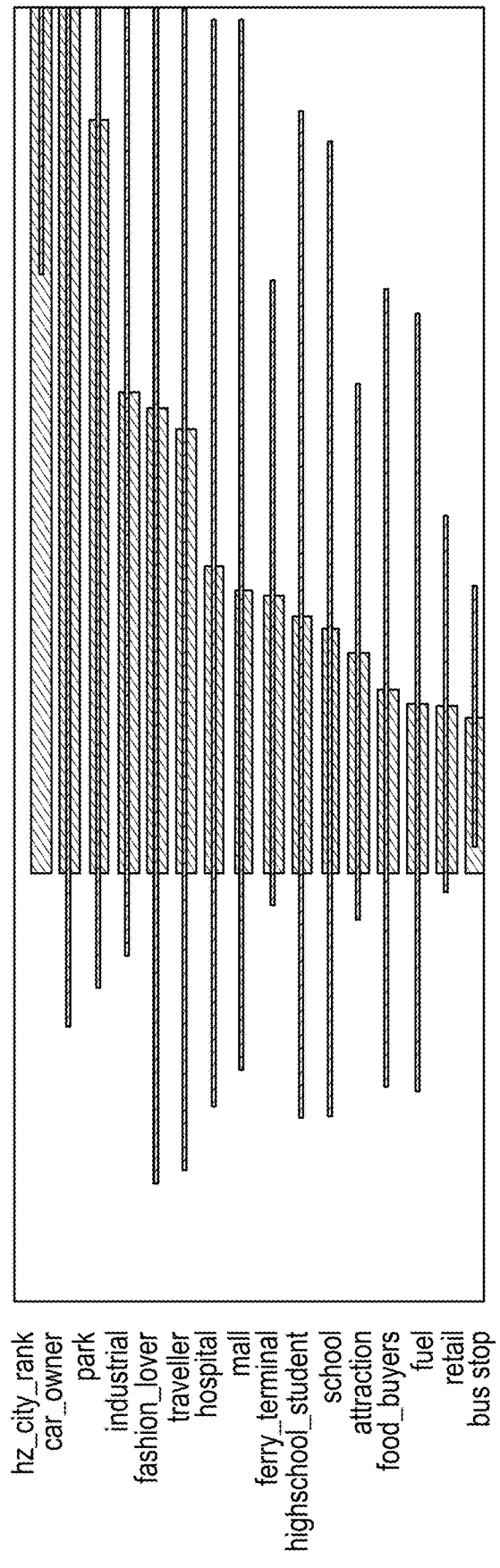
FIGS. 7A-S depict various screenshots of the present invention.
Figure 7I:
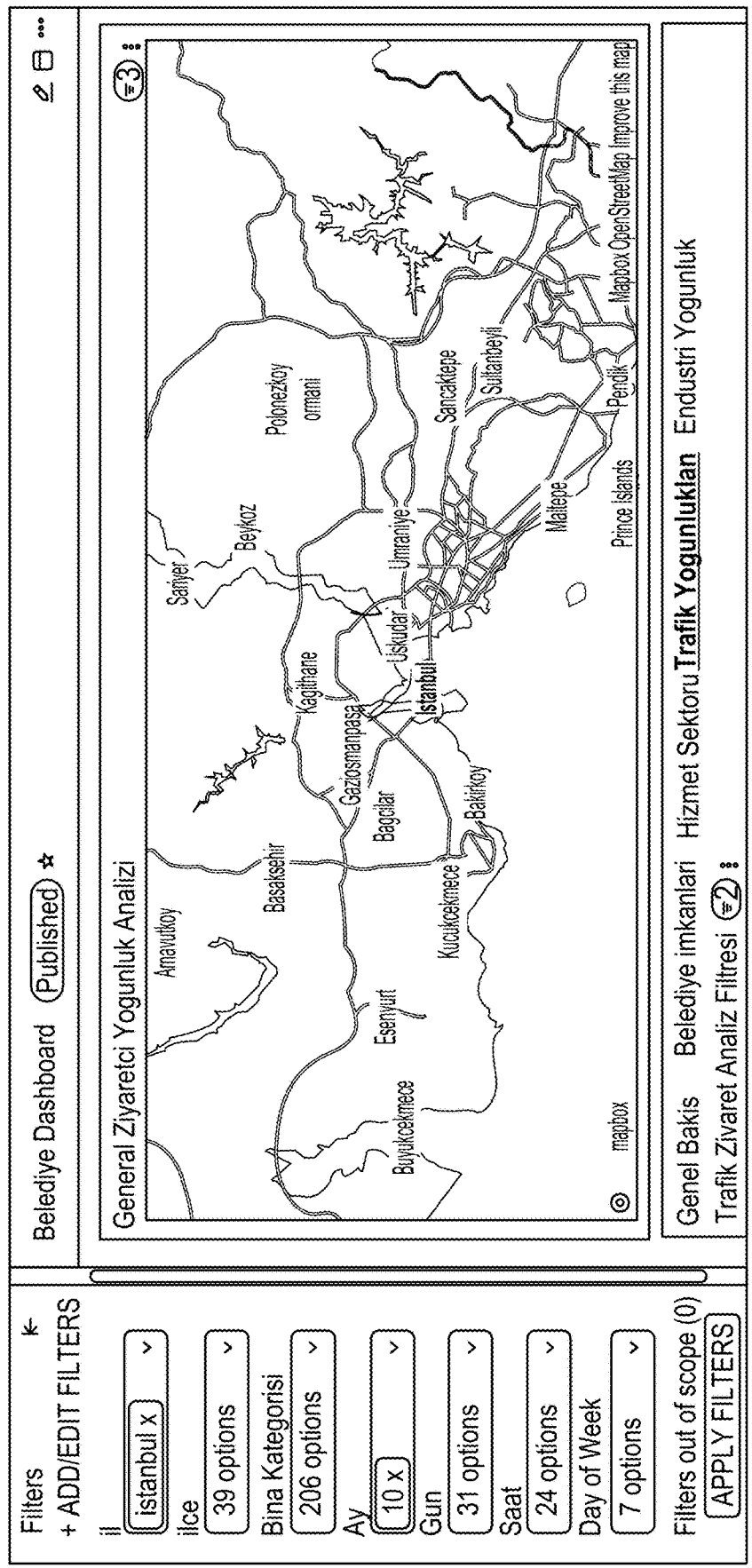
Figure 7J:
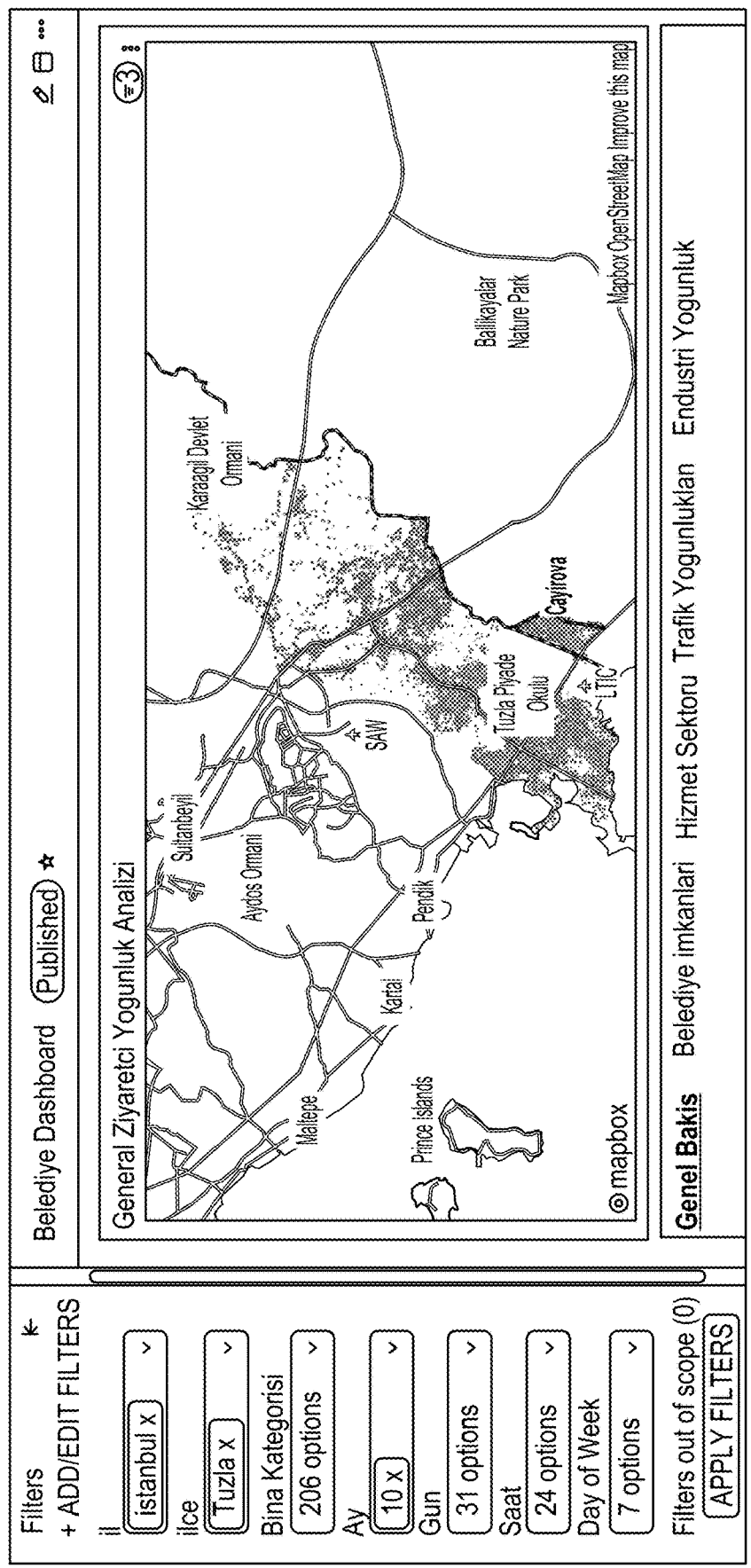
Figure 7L:
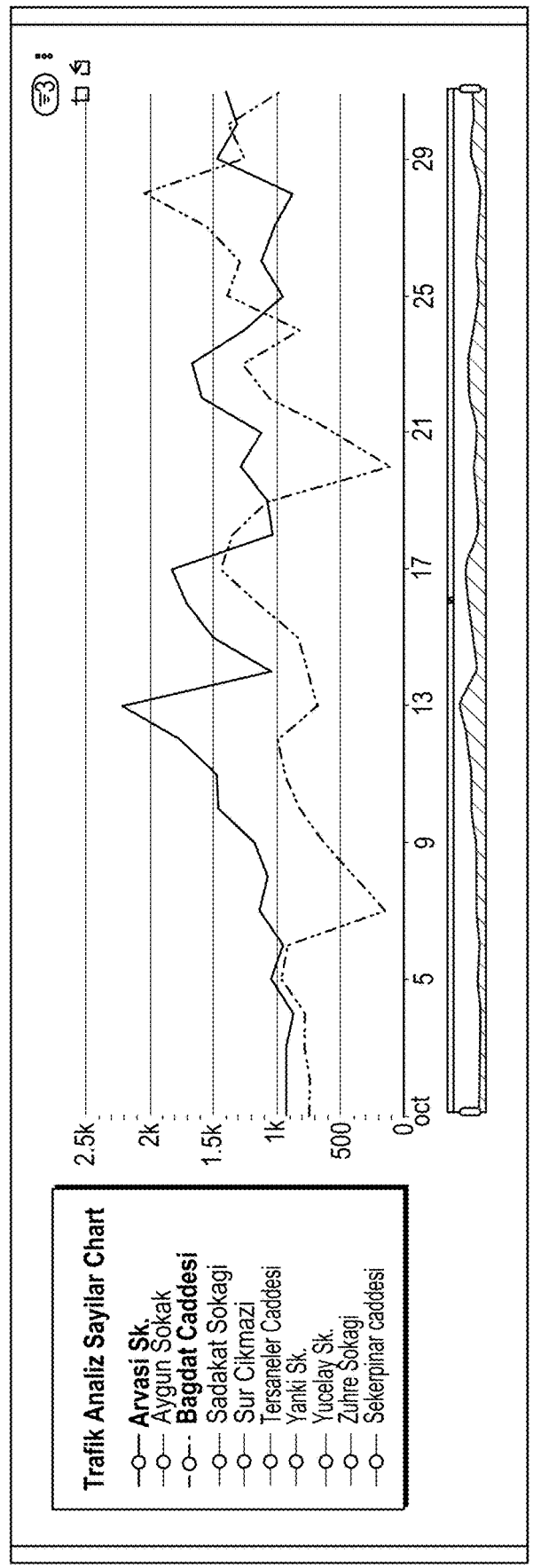
Figure 7M:
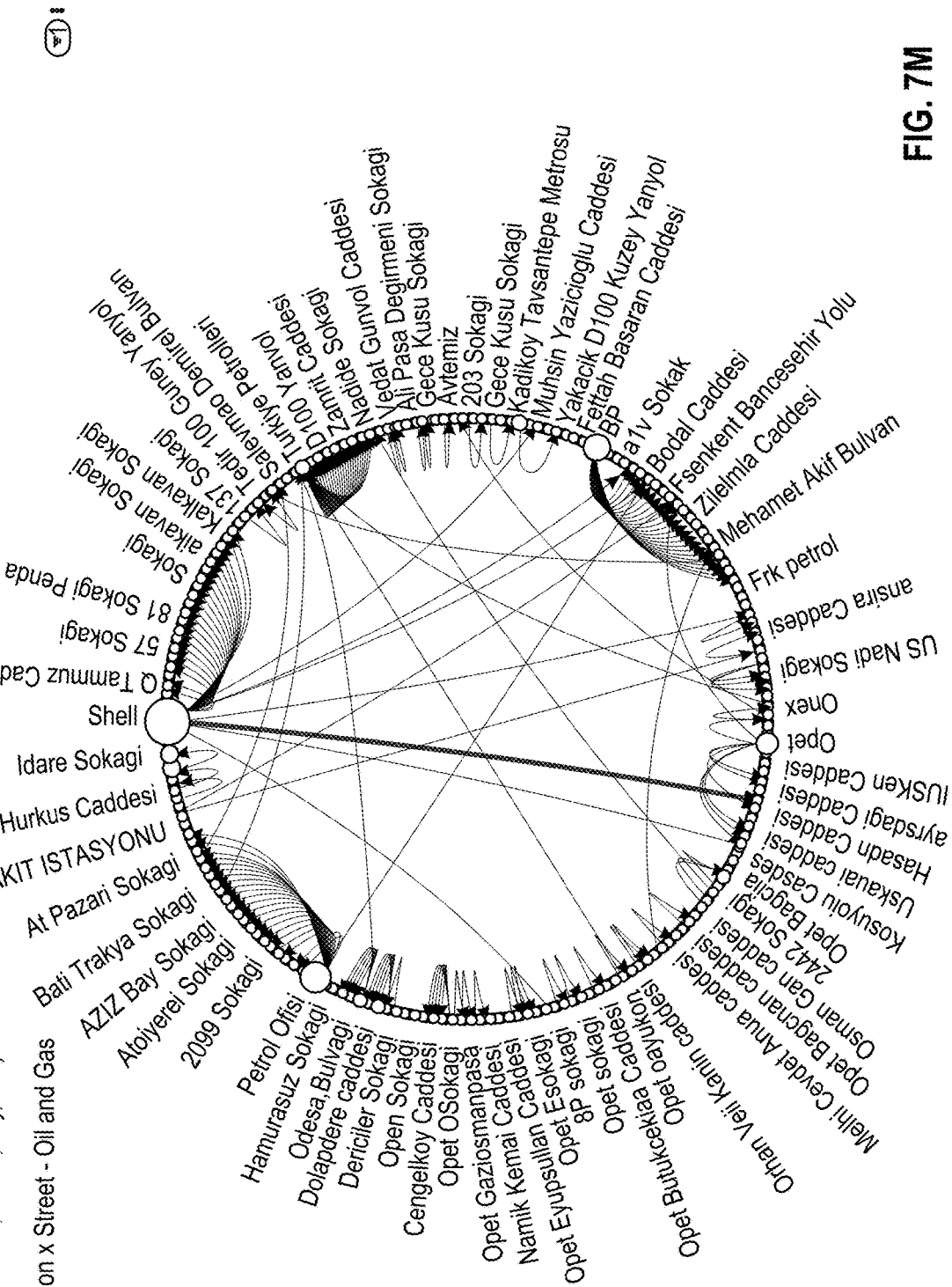
Figure 7N:
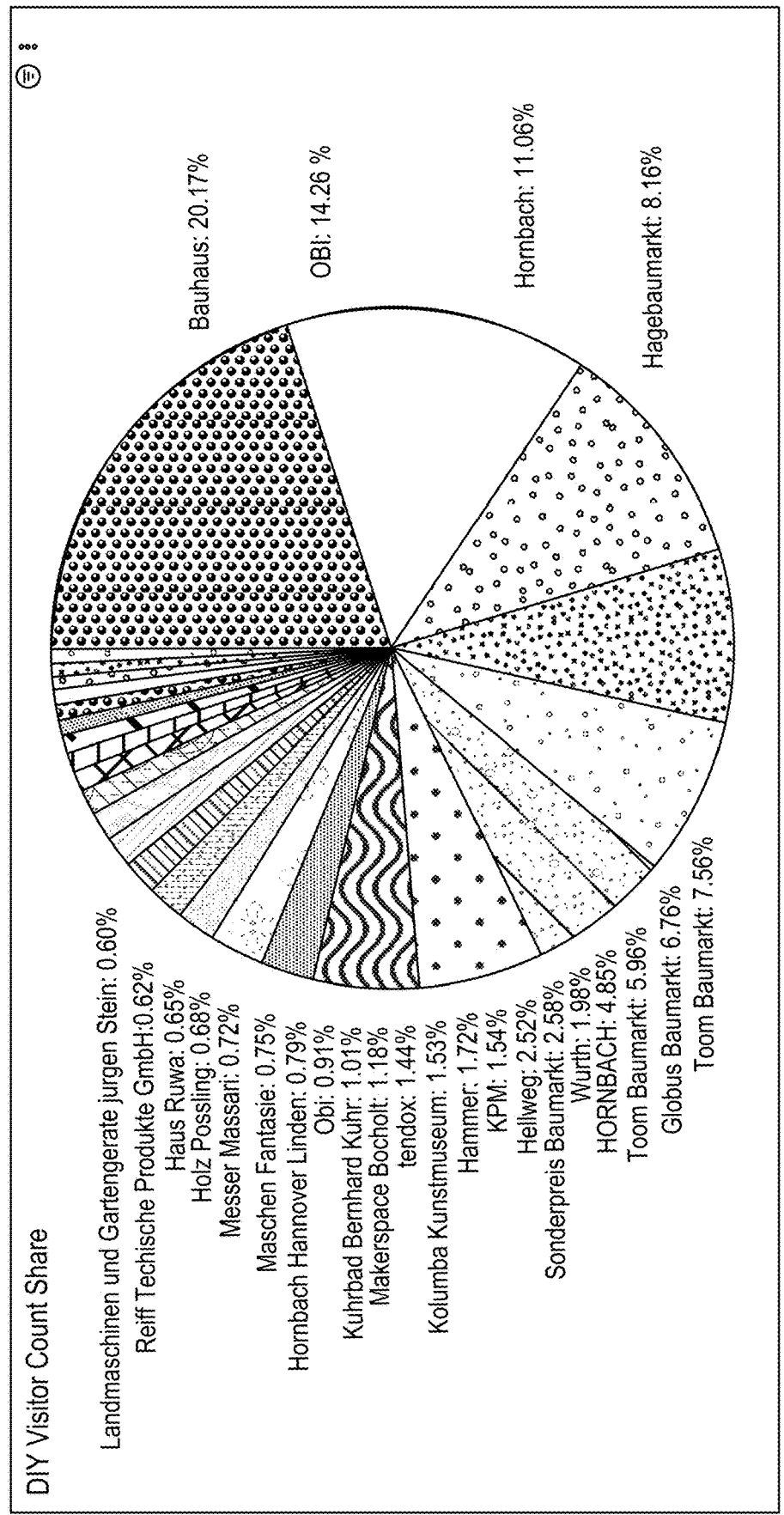
Figure 7O:
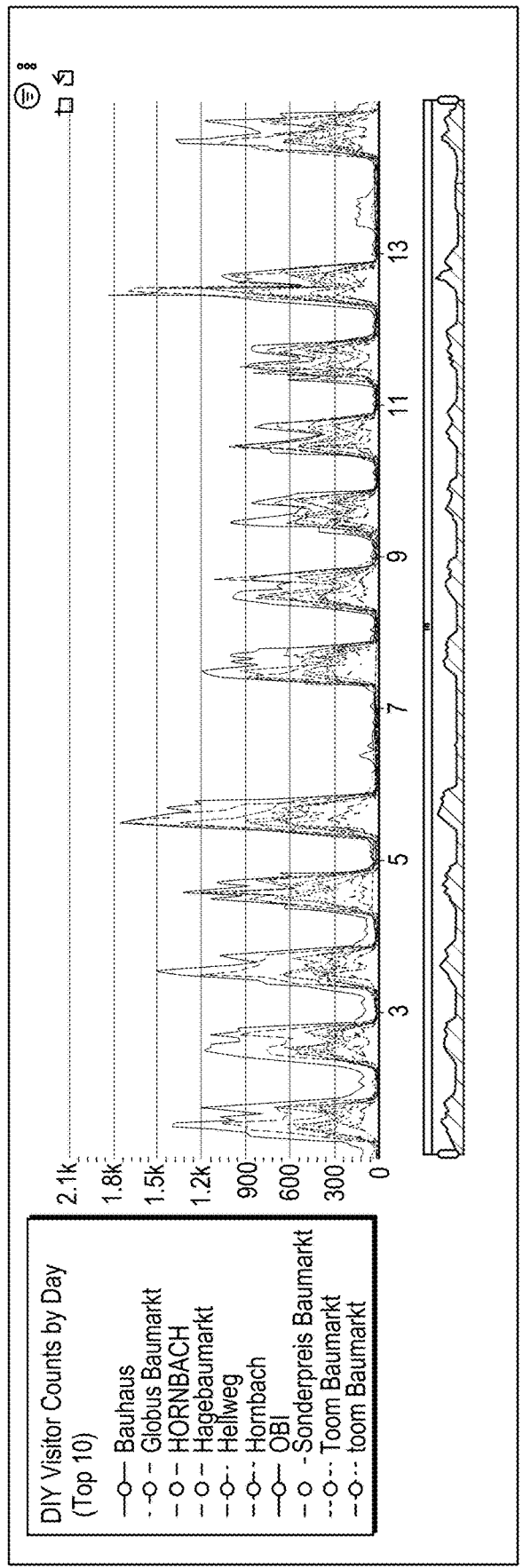
Figure 7P:
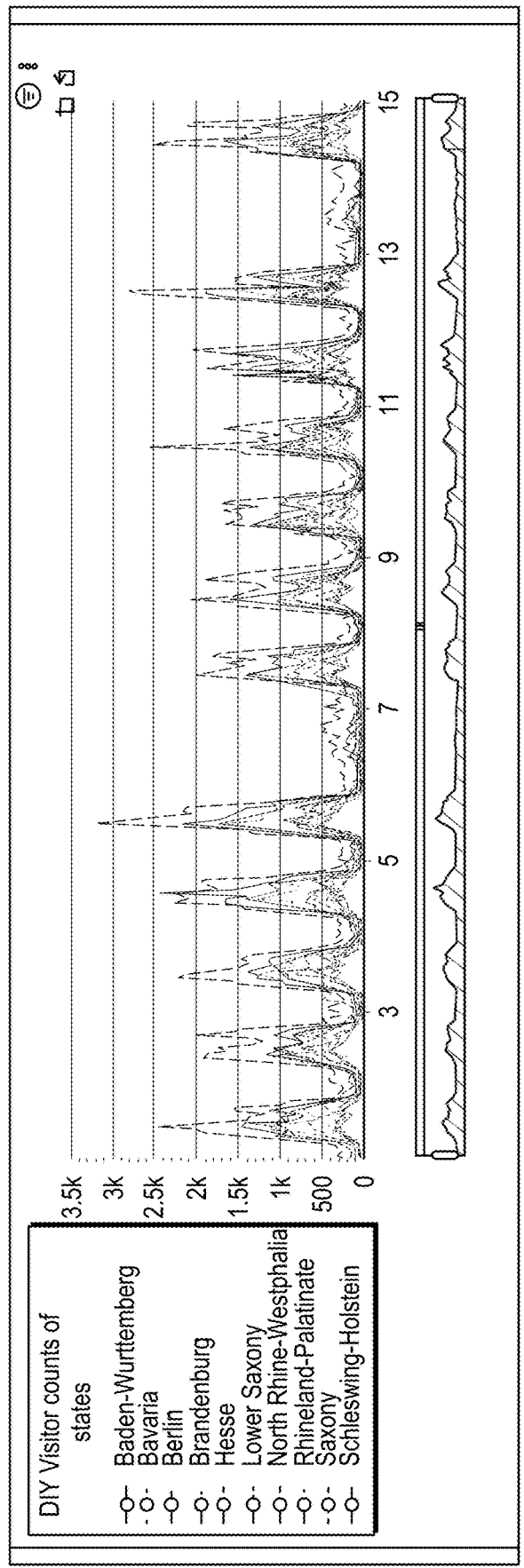
Figure 7Q:
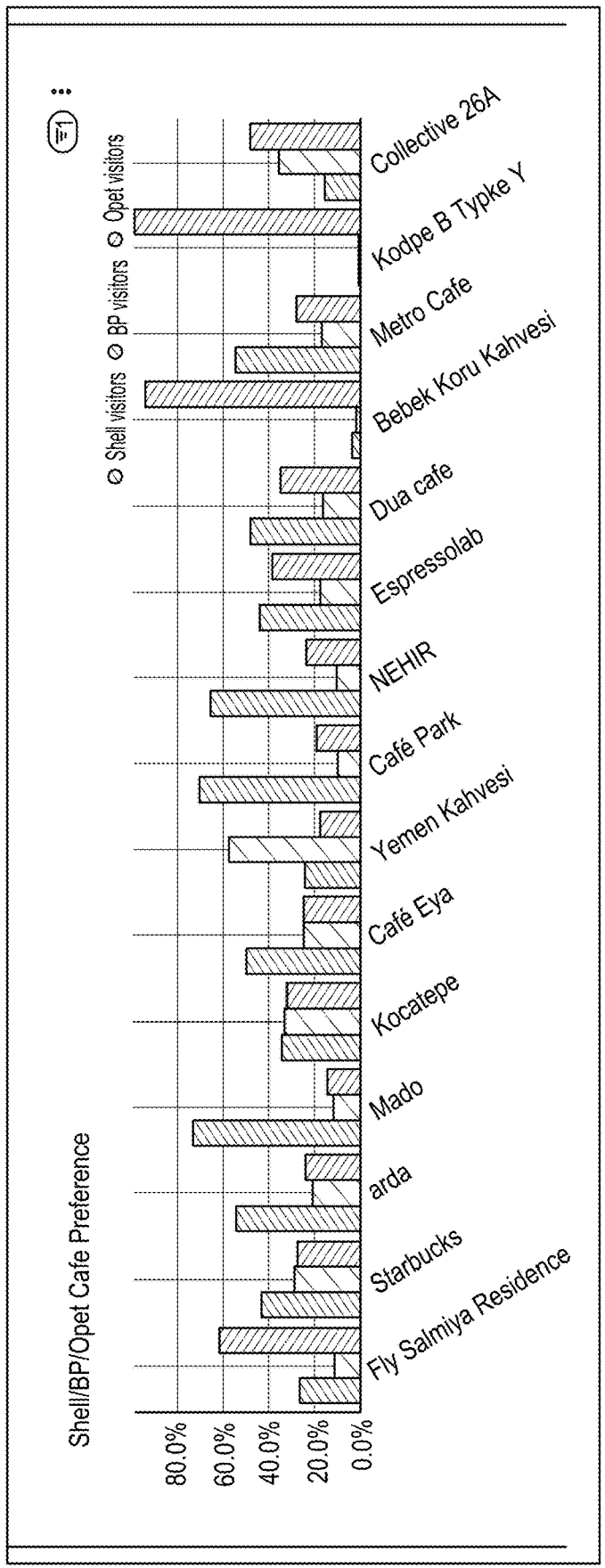
Figure 7R:
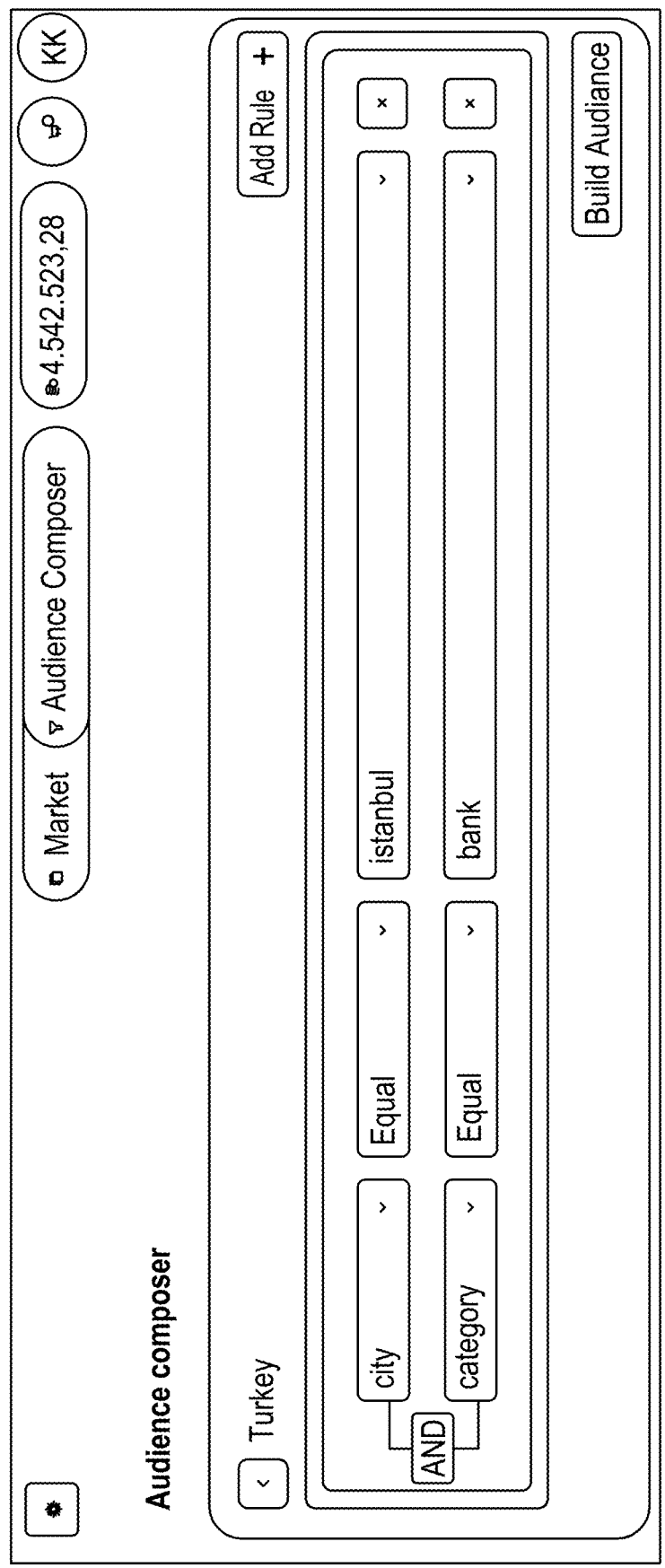
Figure 7S:
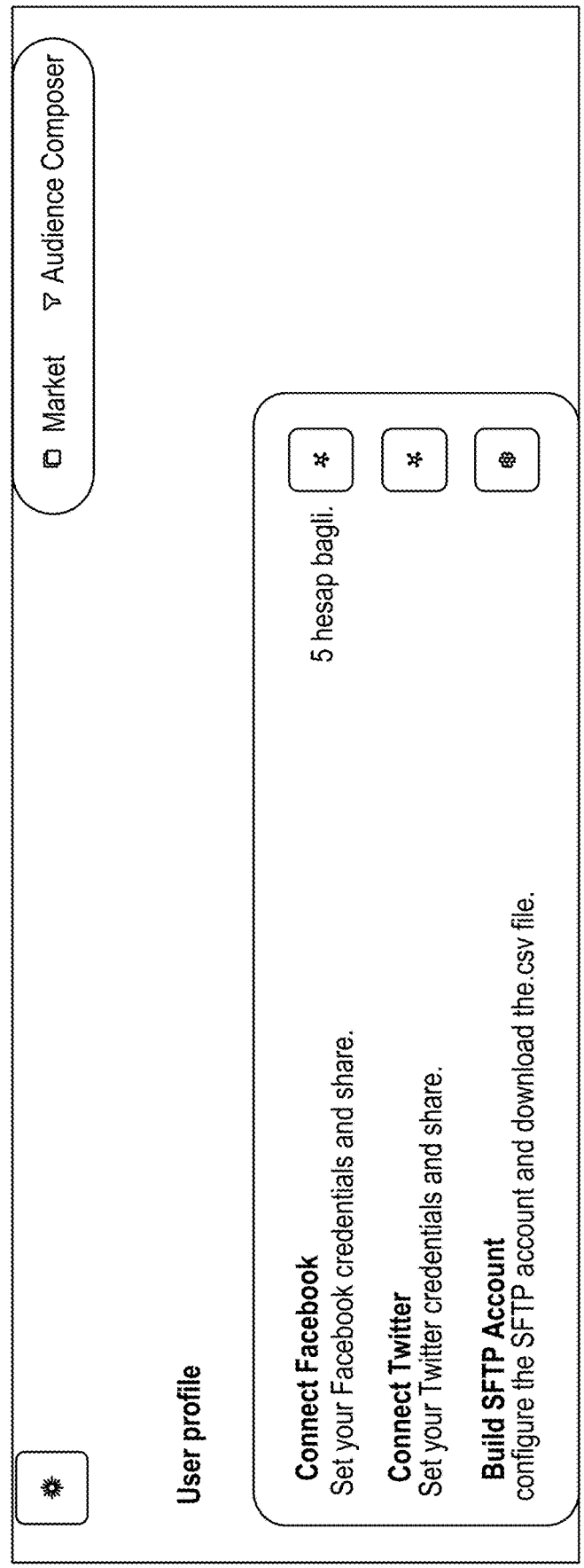

FIGS. 7A through 7S depict various screenshots showing various functional aspects of the present invention. FIG. 7A depicts how a row of unique identifier information (maid or 101-A at FIG. 1) or profile, consisting of a minimum of latitude, longitude and timestamp columns can be further enriched with a city column. FIG. 7B depicts how a row of unique identifier information (maid or 101-A at FIG. 1) or profile consisting of a minimum of latitude, longitude, timestamp and city, can further be enriched with district. FIG. 7C depicts how a row of unique identifier information (maid or 101-A at FIG. 1) or profile consisting of a minimum of latitude, longitude, timestamp, city and district can be further enriched with neighborhood. FIG. 7D depicts how a row of a unique profile information (maid) or profile consisting of a minimum of latitude, longitude, timestamp, city, district, neighborhood and further be enriched with the building type (referred as poi_fclass in our system, in this case residential). FIG. 7E shows how a row of unique profile (maid or 101-A at FIG. 1) consisting of a minimum of latitude, longitude, timestamp, city, district and neighborhood can be further enriched with road/transportation (referred as lin_fclass in our system, in this case a service road) type. FIG. 7F shows how a row of a unique profile information (maid or 101-A at FIG. 1) consisting of a minimum of latitude, longitude, timestamp, city, district, neighborhood and lin_fclass can further be enriched with road/name (referred to as lin_name in our system, in this case "Yeni Hal Caddesi"). FIG. 7G shows the number of visits by building type of each profile, in aggregate within any timeframe (0 as no visits, 1 or more as the amounts of visits). FIG. 7H shows how data aggregated from FIG. 7G is used for correlations on car ownership (car_owner), etc for scoring purposes or statistics. FIG. 7I shows a depiction of a user interface (dashboard), where city, district, neighborhood, month, day, hour or day of week can be filtered by a form of instruction builder 1001 and data automatically is filtered across charts and maps (the example shows the motorway journeys of unique profiles). FIG. 7J shows a depiction of all profiles within a specific city, district in a country and their coordinates to see show the intensity of visits across a map. FIG. 7K shows a pivot table of aggregated on the user interface 701, of profiles where the columns are workzone city, district and the rows are homezone neighborhoods, filtered from the filter box in FIG. 7J, which is a form of instruction builder 1001 at FIG. 5, essentially displaying home to work movements by location on the user interface 701. FIG. 7L compares two roads and their visit counts across a range of dates, filtered by the same filter box on FIG. 7J, which is a form of instruction builder 1001 at FIG. 5, by city and district (detect traffic jam times, etc. by road name) on the user interface 701. FIG. 7M shows a depiction of connections of aggregated unique profiles across various locations (lin_name in this case and poi_name) while displaying them as a network graph, filtered by a filter box on FIG. 7J which is a form of instruction builder 1001 at FIG. 5 on the user interface 701. FIG. 7N shows a depiction of all profiles split by their location visits enabling the user to see the visitor share across locations (poi_name in this case) and can be viewed as a market share pie chart. FIG. 7O shows a depiction of profile visits to locations across a specific country and specific locations (poi_name) across days of a month. FIG. 7P shows a depiction of total profile visits to a specific building type (poi_fclass) broken down by cities/federal states (for example the most profile visits to DIY stores were at North-Rhine-Westphalia in Germany on the $6^{th}$ day). FIG. 7Q shows the distribution of each profile tagged by location and other locations they visit, essentially showing the breakdown of affinities of a type of profile (where else does this profile visit?). FIG. 7R shows a depiction of a query builder/instruction builder (701, 1001), where all the generated profiles can be selected and generated without using an SQL code, and allows the user to retrieve these profiles as a list of IDs through the Build Audience (green box) button. FIG. 7S shows a depiction of how these unique IDs can be sent across to social media channels or to other servers, on the user interface 701, through the internet (for targeted advertising and profile matching on Facebook®/Twitter® (1002-A), SFTP server (1002-B), etc.)

The above-described features and applications can be implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer-readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid-state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application-specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links or by a combination thereof) through a communications network. In a distributed computing environment, program modules may be located in both local and remote memory storage devices.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based on design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a system and method for mirroring a digital twin universe through data fusion of static and dynamic location, time, and event data. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. An article of manufacture having a non-transitory computer-readable storage medium comprising computer-readable program code executable by a processor to implement a method, the method comprising the steps of:
 (a) receiving, over a network, from a first data source associated with either a static object or a static location at least the following: a first identifier, a first latitude-longitude pair, and a first timestamp;
 (b) generating a first geometric shape comprising at least the first latitude-longitude pair and the first timestamp;
 (c) storing the first geometric shape in a first datastore associated with either the static object or the static location;
 (d) receiving, over the network, from a second data source associated with either a dynamic object or a dynamic location at least the following: a second identifier, a second latitude-longitude pair, and a second timestamp, the first latitude-longitude pair and the second latitude-longitude pair having a similar value;
 (e) generating a second geometric shape comprising at least the second latitude-longitude pair and the second timestamp;
 (f) storing the second geometric shape in a second datastore associated with either the dynamic object or the dynamic location;
 (g) using a spatial algorithm and determining a match between the first latitude-longitude pair associated with the first geometric shape and the second latitude-longitude pair associated with the second geometric shape;
 (h) storing the first geometric shape and second geometric shape in a data fusion module;
 (i) receiving, over a network, from a third data source associated with another dynamic object or dynamic location at least a third identifier, a third latitude-longitude pair, and a third timestamp data, the first latitude-longitude pair, the second latitude-longitude pair, and the third latitude-longitude pair having the similar value;
 (j) generating a third geometric shape comprising at least the third latitude-longitude pair and the third timestamp;
 (k) storing the third geometric shape in the data fusion module;
 (l) using the spatial algorithm and determining another match between the third latitude-longitude pair associated with the third geometric shape and the first and second geometric shapes;
 (m) generating a profile for the first, second, and third latitude-longitude pairs having similar values, the profile associated with any of the following: the static location, the static object, the dynamic location, or the dynamic object;
 (n) receiving by the data fusion module, over the network, a query input via an interface; and
 (o) transmitting, in response to the query, an output from the data fusion module to the interface over the network, wherein the interface displays the output comprising any of, or a combination of, the first geometric shape, second geometric shape, or third geometric shape.

2. The article of manufacture of claim 1, wherein the generated profile is sent over a network to one or more of the following external platforms: a social media platform, an advertising platform, a data management platform, or an object storage platform.

3. The article of manufacture of claim 1, wherein the method further comprises the step of using one or more pre-defined rules or one or more machine-defined rules to control the output displayed at the interface.

4. The article of manufacture of claim 1, wherein the output comprises any of, or a combination of, the following: the first identifier, second identifier, third identifier, the first latitude-longitude pair, second latitude-longitude pair, third latitude-longitude pair, the first timestamp, second timestamp, or third timestamp, a graphical representation of the first geometric shape, a graphical representation of the second geometric shape, or a graphical representation of the third geometric shape.

5. The article of manufacture of claim 1, wherein the interface is used to retrieve any of the following information: a historical or real-time record associated with at least one given identifier, a historical or real-time record associated with at least one given latitude-longitude pair, or a historical or real-time record associated with at least one profile.

6. The article of manufacture of claim 1, wherein the method further comprises the step of applying at least one time filter to historical or real-time records displayed via the interface.

7. The article of manufacture of claim 1, wherein the method further comprises the step of applying at least one latitude-longitude filter to historical or real-time records displayed via the interface.

8. The article of manufacture of claim 1, wherein the method further comprises the step of applying at least one profile filter to historical or real-time records displayed via the interface.

* * * * *